United States Patent
Ishigami et al.

(10) Patent No.: US 7,850,373 B2
(45) Date of Patent: Dec. 14, 2010

(54) OPTICAL BLOCK REINFORCING MEMBER, OPTICAL BLOCK AND OPTICAL MODULE

(75) Inventors: Yoshiaki Ishigami, Hitachi (JP); Kenichi Tamura, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 352 days.

(21) Appl. No.: 12/073,902

(22) Filed: Mar. 11, 2008

(65) Prior Publication Data
US 2008/0232737 A1    Sep. 25, 2008

(30) Foreign Application Priority Data

Mar. 12, 2007  (JP)  ............... 2007-061798
Nov. 14, 2007  (JP)  ............... 2007-295556

(51) Int. Cl.
*G02B 6/36* (2006.01)
(52) U.S. Cl. ............... 385/92; 385/88; 385/89; 385/90; 385/91
(58) Field of Classification Search ............... 385/88, 385/89, 90, 91, 92
See application file for complete search history.

(56) References Cited

U.S. PATENT DOCUMENTS 6,318,909 B1    11/2001 Giboney et al.
6,835,003 B2    12/2004 Giboney et al.
2006/0153506 A1    7/2006 Cheng et al.

FOREIGN PATENT DOCUMENTS

JP    2000-249883    9/2000

*Primary Examiner*—Jennifer Doan
(74) *Attorney, Agent, or Firm*—McGinn IP Law Group, PLLC

(57) ABSTRACT

An optical module includes a circuit board, an optical element mounted on the circuit board, an electronic parts for driving the optical element, an optical block optically coupled with the optical element and adapted to be connected to an optical connector, wherein the optical block includes a protrusion including a guide pin for connecting the optical block to the optical connector, and a receiving portion formed nearly cylindrical around a root of the guide pin and having a receiving surface on which the optical block abuts the optical connector, an optical block reinforcing member including an upper lid for covering the optical block, and sidewalls for covering both sides of the optical block arranged perpendicular to a width direction of the optical connector, wherein the optical block reinforcing member includes a separate body from the optical block and is adapted to be attached on the optical block, and a casing for housing the circuit board, the optical element, the electronic parts, the optical block and the optical block reinforcing member.

14 Claims, 18 Drawing Sheets

1 OPTICAL BLOCK REINFORCING MEMBER
11 OPTICAL MODULE
12 CIRCUIT BOARD
16 OPTICAL BLOCK
19 ADAPTOR
73 GUIDE PIN
5 THROUGH HOLE
6 FITTING PROTRUSION

1 OPTICAL BLOCK REINFORCING MEMBER
11 OPTICAL MODULE
12 CIRCUIT BOARD
16 OPTICAL BLOCK
19 ADAPTOR
73 GUIDE PIN
 5 THROUGH HOLE
 6 FITTING PROTRUSION

| 1 OPTICAL BLOCK REINFORCING MEMBER | 19 ADAPTOR |
| 11 OPTICAL MODULE | 73 GUIDE PIN |
| 12 CIRCUIT BOARD | 5 THROUGH HOLE |
| 16 OPTICAL BLOCK | 6 FITTING PROTRUSION |

| 1 OPTICAL BLOCK REINFORCING MEMBER | 6 FITTING PROTRUSION |
|---|---|
| 16 OPTICAL BLOCK | 72 FIRST LENS ARRAY |
| 73 GUIDE PIN | 76 SECOND LENS ARRAY |

1 OPTICAL BLOCK REINFORCING MEMBER
12 CIRCUIT BOARD
16 OPTICAL BLOCK
14 ELECTRICAL CONNECTOR
81 OPTICAL FIBER
82 MT CONNECTOR

| 1 OPTICAL BLOCK REINFORCING MEMBER | 16 OPTICAL BLOCK |
| 11 OPTICAL MODULE | 19 ADAPTOR |
| 12 CIRCUIT BOARD | 83 CASING |
| 14 ELECTRICAL CONNECTOR | |

| 1 OPTICAL BLOCK REINFORCING MEMBER | 19 ADAPTOR |
| 12 CIRCUIT BOARD | 101 OPTICAL MODULE |
| 14 ELECTRICAL CONNECTOR | 102 SUB-BOARD |
| 16 OPTICAL BLOCK | |

| 1 OPTICAL BLOCK REINFORCING MEMBER | 19 ADAPTOR |
| 12 CIRCUIT BOARD | 51 REFLECTION SURFACE |
| 14 ELECTRICAL CONNECTOR | 102 SUB-BOARD |
| 16 OPTICAL BLOCK | |

| | |
|---|---|
| 201 OPTICAL BLOCK REINFORCING MEMBER | 273 GUIDE PIN |
| 211 OPTICAL MODULE | 203 RECEIVING PORTION |
| 212 CIRCUIT BOARD | 205 THROUGH HOLE |
| 216 OPTICAL BLOCK | 206 FITTING PROTRUSION |
| 219 ADAPTOR | 214 ELECTRICAL CONNECTOR |

| 201 OPTICAL BLOCK REINFORCING MEMBER | 214 ELECTRICAL CONNECTOR |
| 211 OPTICAL MODULE | 216 OPTICAL BLOCK |
| 212 CIRCUIT BOARD | 219 ADAPTOR |

| 201 OPTICAL BLOCK REINFORCING MEMBER | 205 THROUGH HOLE |
| --- | --- |
| 211 OPTICAL MODULE | 206 FITTING PROTRUSION |
| 212 CIRCUIT BOARD | 251 REFLECTION SURFACE |
| 216 OPTICAL BLOCK | 272 FIRST LENS ARRAY |
| 219 ADAPTOR | 276 SECOND LENS ARRAY |

| 201 OPTICAL BLOCK REINFORCING MEMBER | 206 FITTING PROTRUSION |
| 216 OPTICAL BLOCK | 272 FIRST LENS ARRAY |
| 273 GUIDE PIN | 276 SECOND LENS ARRAY |
| 203 RECEIVING PORTION | |

| 201 OPTICAL BLOCK REINFORCING MEMBER | 203 RECEIVING PORTION |
| 212 CIRCUIT BOARD | 272 FIRST LENS ARRAY |
| 214 ELECTRICAL CONNECTOR | 276 SECOND LENS ARRAY |
| 216 OPTICAL BLOCK | 281 OPTICAL FIBER |
| 273 GUIDE PIN | 282 MT CONNECTOR |

| 201 OPTICAL BLOCK REINFORCING MEMBER | 214 ELECTRICAL CONNECTOR |
| 292 SUB-BOARD | 216 OPTICAL BLOCK |
| 212 CIRCUIT BOARD | 219 ADAPTOR |

201 OPTICAL BLOCK REINFORCING MEMBER
292 SUB-BOARD
216 OPTICAL BLOCK
273 GUIDE PIN
203 RECEIVING PORTION
206 FITTING PROTRUSION
272 FIRST LENS ARRAY

| 201 OPTICAL BLOCK REINFORCING MEMBER | 273 GUIDE PIN |
| 231 OPTICAL MODULE | 203 RECEIVING PORTION |
| 292 SUB-BOARD | 205 THROUGH HOLE |
| 212 CIRCUIT BOARD | 206 FITTING PROTRUSION |
| 214 ELECTRICAL CONNECTOR | 251 REFLECTION SURFACE |
| 216 OPTICAL BLOCK | 232 OPENING |
| 219 ADAPTOR | |

| 141 OPTICAL MODULE | 144 PLANAR LENS |
| 142s SUB-BOARD | 146 CARD EDGE CONNECTOR |
| 142m MAIN BOARD | 147 OPTICAL FIBER |
| 142f FLEXIBLE PORTION | 148 OPTICAL CONNECTOR |
| 143 OPTICAL ELEMENT | |

OPTICAL BLOCK REINFORCING MEMBER, OPTICAL BLOCK AND OPTICAL MODULE

The present application is based on Japanese patent application Nos. 2007-061798 and 2007-295556 filed on Mar. 12, 2007 and Nov. 14, 2007, respectively, the entire contents of which are incorporated herein by reference.

BACKGROUND OF THE INVENTION

1. Field of the Invention

This invention relates to an optical block reinforcing member that is used in an optical module to transmit and/or receive optical signals as Ethernet (registered trademark) signal being gigabit-class in signal transmission speed so as to reinforce an optical block connected to an optical connector, the optical block for reducing a pressing force occurred when connecting the optical connector to the optical block, and the optical module composed of the optical block reinforcing member and the optical block.

2. Description of the Related Art

In recent years, the bandwidth of the Internet increases. Especially, Ethernet (registered trademark) spreads as a core technology for domestic LAN and WAN since it is inexpensive and easy in operation.

At present, in Japan, the standardization of 10-gigabit Ethernet (registered trademark) has been completed, where in optical modules mainly for middle-range network the transmission speed is upgraded from 1 Gbit/s to 10 Gbit/s. Also, 40 to 100 Gbit/s class Ethernet (registered trademark) with a transmission speed over 10 Gbit/s has been researched and developed. An example of an optical module used therefor is an optical transceiver using plural semiconductor laser diodes (LD) or photodiodes (PD).

US 2006/0153506A1 discloses, as shown in FIG. 27, an optical module 141 that uses a circuit board 142 as rigid flex board (or a flex rigid printed wiring board).

The circuit board 142 is composed of a sub-board 142s, a main board 142m and a flexible portion 142f connecting the boards. An optical element 143 is mounted on the sub-board 142s, a planar lens 144 is disposed to cover the optical element 143, and the planar lens 144 is attached to the inside front face of MSF (Metal Support Frame) 145. The main board 142m is provided with a card edge connector 146 at the other end and is fixed on the inside bottom face of the MSF. The optical module 141 is used such that the card edge connector 146 side of the circuit board 142 is inserted into a female connector of a host board of a network device such as a switching hub.

In the optical module 141, the flex portion 142f is provided between the planar lens 144 and the main board 142m. Thus, even if the MSF 145 or the circuit board 142 is slightly deformed when inserting the circuit board 142 into the female connector of the host board, stress can be absorbed by the flex portion 142f so that it is not generated at the connection part between the planar lens 144 and the sub-board 142s.

Further, in the optical module 141, a pressing force F is applied when connecting an optical connector 148 with an optical fiber 147 to the planar lens 144. However, since stress can be absorbed by the flex portion 142f so that it is not generated at the connection part between the planar lens 144 and the sub-board 142s. Thus, in US 2006/0153506A1, it is essential to have the flex portion 142f.

JP-A-2000-249883 also discloses an optical module using the rigid flex board.

However, the circuit board 142 used by the optical module 141 is formed with a rigid flex board which is more expensive than a normal rigid board.

Therefore, the cost of the optical module 141 must increase so that the low-cost installation as one of the advantages of the Ethernet (registered trademark) will be eliminated.

Until now, no optical module with high reliability has been developed that uses the low-cost rigid board as the circuit board and can prevent stress from being generated at the connection part between the lens and the circuit board.

SUMMARY OF THE INVENTION

It is an object of the invention to provide an optical module that uses a low-cost rigid board as a circuit board and can reduce stress generated at a connection part between an optical block and the circuit board. An optical block reinforcing member and an optical block are also provided in relation to the above object.

(1) According to one embodiment of the invention, an optical block reinforcing member for reinforcing an optical block disposed on a circuit board and adapted to be connected to an optical connector comprises:

a pressure-receiving surface to which a pressure from the optical connector is applied when connecting the optical connector to the optical block, wherein the optical block reinforcing member comprises a separate body from the optical block and is adapted to be attached covering the optical block on the circuit board.

(2) According to another embodiment of the invention, an optical block reinforcing member for receiving a pressure from an optical connector when connecting the optical connector with an optical fiber to an optical block, the optical block being adapted to be optically coupled with an optical element mounted on a circuit board comprises:

a sidewall covering the optical block; and a pressure-receiving surface on which the optical block reinforcing member contacts a joint surface of the optical connector, wherein the optical block reinforcing member comprises a separate body from the optical block and is adapted to be attached covering the optical block on the circuit board.

In the above embodiments (1) and (2), the following modifications, changes and a combination thereof can be made.

(i) The optical block comprises A) a block body, B) a first lens array on a front surface of the block body, the first lens array being adapted to be optically coupled with an optical fiber of the optical connector, C) a reflection surface in the block body for changing a propagation direction of an optical signal, and D) a second lens array on a bottom surface of the block body, the second lens array being adapted to be optically coupled with an optical element mounted on the circuit board, and the optical block reinforcing member is substantially C-shaped for covering both sides and a front face of the optical block and comprises an opening on a front face thereof, the opening being adapted to allow passage of an optical signal from the optical connector or the first lens array, wherein the pressure-receiving surface is formed around the opening.

(ii) The circuit board comprises a rigid board comprising a through hole formed therein, and the optical block reinforcing member comprises a fitting protrusion at a bottom thereof, the fitting protrusion being adapted to be fitted into the through hole.

(iii) The optical block comprises a protrusion at which the optical block contacts the optical block reinforcing member.

(iv) The optical block reinforcing member comprises a thickness for allowing a joint surface of the optical connector to be located nearly at a focal position of the first lens array.

(v) The optical block reinforcing member comprises a metal material and integrally formed by sheet pressing or press molding.

(3) According to another embodiment of the invention, an optical module comprises:

an optical element for converting an electrical signal into an optical signal or converting an optical signal into an electrical signal; and the optical block reinforcing member as defined by the above embodiment (1) or (2).

In the above embodiment (3), the following modifications, changes and a combination thereof can be made.

(vi) The optical module further comprises:

a sub-board comprising ceramics, wherein the optical element is mounted on the sub-board, and the sub-board with the optical element is disposed between the optical block reinforcing member and the circuit board.

(4) According to another embodiment of the invention, an optical block reinforcing member for reinforcing an optical block disposed on a circuit board and adapted to be connected to an optical connector comprises:

an upper lid for covering the optical block; and sidewalls for covering both sides of the optical block arranged perpendicular to a width direction of the optical connector, wherein the optical block reinforcing member comprises a separate body from the optical block and is adapted to be attached on the optical block.

In the above embodiment (4), the following modifications, changes and a combination thereof can be made.

(vii) The optical block comprises a stopper portion comprising an upper stopper portion protruding upward and a side stopper portion protruding laterally, and the optical block reinforcing member is stopped by the stopper portion in a direction opposite a connecting direction of the optical connector when the optical block reinforcing member is attached on the optical block.

(viii) The optical block reinforcing member comprises a fitting protrusion at a bottom thereof, the fitting protrusion being adapted to be fitted into a through hole formed in the circuit board.

(5) According to another embodiment of the invention, an optical block disposed on a circuit board and adapted to be connected to an optical connector, comprising:

a protrusion comprising a guide pin for connecting the optical block to the optical connector, and a receiving portion formed nearly cylindrical around a root of the guide pin and comprising a receiving surface on which the optical block abuts the optical connector; and a fiber connecting member formed on a connection surface of the optical block to the optical connector and adapted to be optically coupled with an optical fiber of the optical connector, wherein the receiving portion protrudes by a height nearly equal to a focal distance of the fiber connecting member.

(6) According to another embodiment of the invention, an optical module comprises:

a circuit board;

an optical element mounted on the circuit board;

an electronic parts for driving the optical element;

an optical block optically coupled with the optical element and adapted to be connected to an optical connector, wherein the optical block comprises a protrusion comprising a guide pin for connecting the optical block to the optical connector, and a receiving portion formed nearly cylindrical around a root of the guide pin and comprising a receiving surface on which the optical block abuts the optical connector;

an optical block reinforcing member comprising an upper lid for covering the optical block, and sidewalls for covering both sides of the optical block arranged perpendicular to a width direction of the optical connector, wherein the optical block reinforcing member comprises a separate body from the optical block and is adapted to be attached on the optical block; and a casing for housing the circuit board, the optical element, the electronic parts, the optical block and the optical block reinforcing member.

In the above embodiment (6), the following modifications, changes and a combination thereof can be made.

(ix) The optical block further comprises a fiber connecting member formed on a connection surface of the optical block to the optical connector and adapted to be optically coupled with an optical fiber of the optical connector, wherein the receiving portion protrudes by a height nearly equal to a focal distance of the fiber connecting member.

(x) The optical block further comprises a stopper portion comprising an upper stopper portion protruding upward and a side stopper portion protruding laterally, and the optical block reinforcing member is stopped by the stopper portion in a direction opposite a connecting direction of the optical connector when the optical block reinforcing member is attached on the optical block.

(xi) The optical module further comprises a sub-board disposed on the circuit board and comprising a material harder than the circuit board, wherein the optical element is mounted on the sub-board.

(xii) The circuit board comprises an opening, and the sub-board is disposed covering the opening on the circuit board.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

At present, network devices (e.g., switching hub and router) or servers are operated in distributed processing through the cluster connection to increase the throughput. In other words, rather than by increasing the performance of each device, it is tried to enhance the throughput by distributing a task to plural processing devices. In order to make a connection between the distributed devices, parallel optical communications are conducted by an optical module in this embodiment according to the invention.

A metal wiring is conventionally used to make the connection between the distributed devices, whereby the interconnection between the network devices or severs was complicated and a wide space was needed for disposing the devices. Therefore, as the bandwidth required increases, the metal wiring reaches a limit in amount and weight. Thus, a part of high-end devices starts using a parallel optical transmission module therein.

The invention is devised under these circumstances and is to make the connection between the distributed devices for relatively short-distance parallel optical communications. The distributed devices behave as a single unit by being connected each other.

First Embodiment

Figure 1:
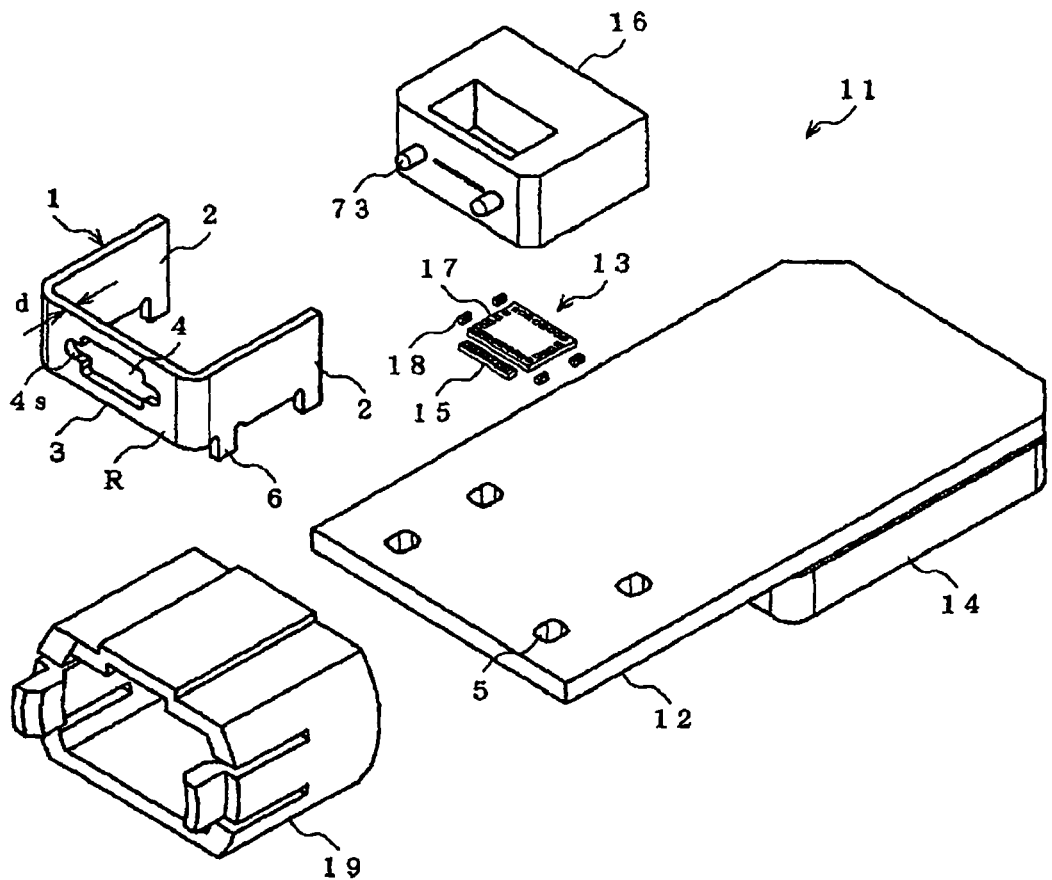
FIG. 1 is an exploded perspective view showing a main part of an optical module using an optical block reinforcing member in a first preferred embodiment according to the invention.
Figure 2:
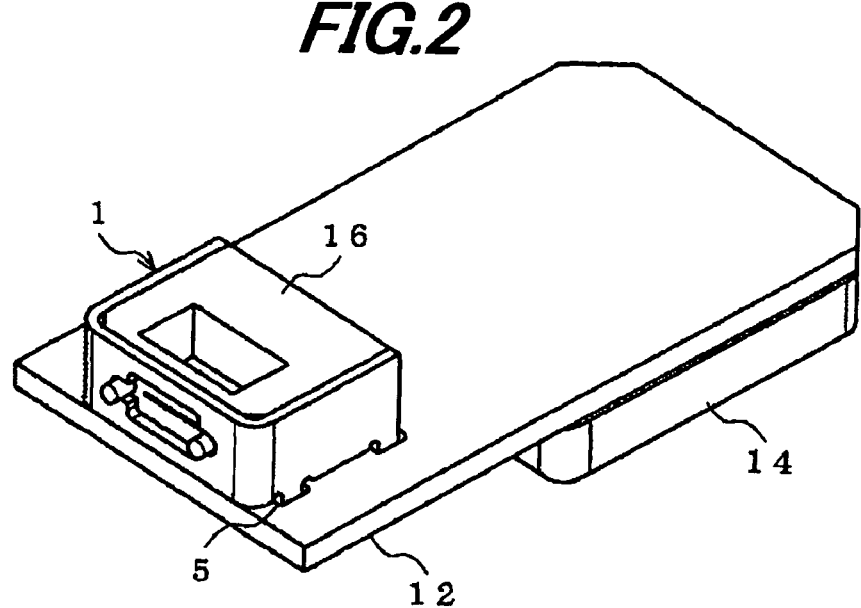
FIG. 2 is a perspective view showing the optical module in FIG. 1 where an optical block and the optical block reinforcing member are mounted on a circuit board.
Figure 3:
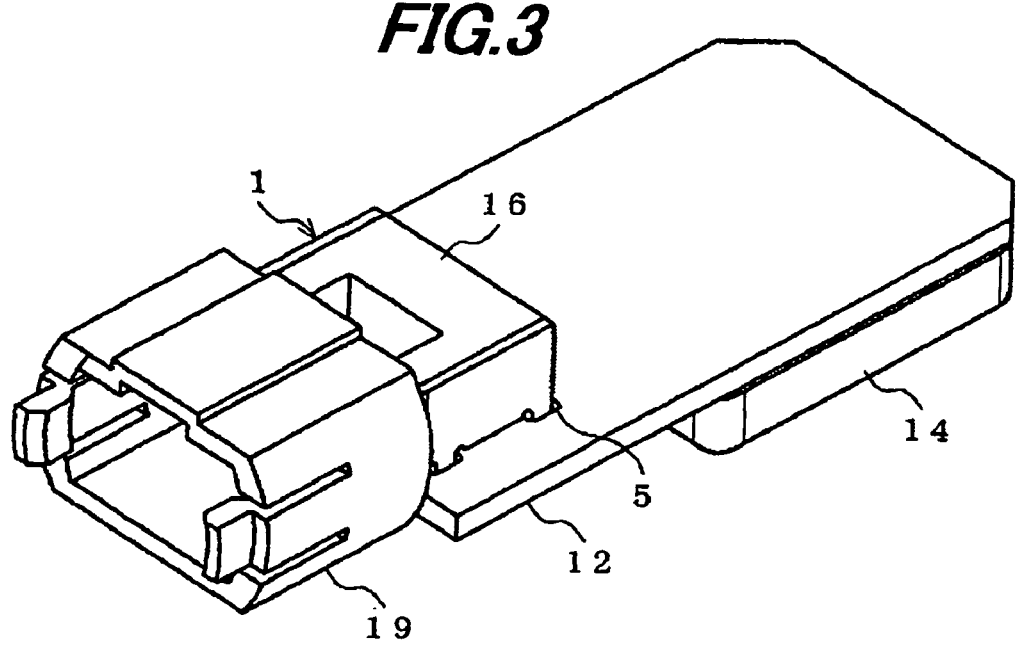
FIG. 3 is a perspective view showing the optical module in FIG. 2 with an adaptor for an optical connector.

Referring to FIGS. 1 to 3, an optical module in a first preferred embodiment of the invention will be explained that uses an optical block reinforcing member 1.

FIG. 1 is an exploded perspective view showing a main part of the optical module using the optical block reinforcing member in the first preferred embodiment according to the invention. FIG. 2 is a perspective view showing the optical module in FIG. 1 where an optical block and the optical block reinforcing member are mounted on a circuit board. FIG. 3 is a perspective view showing the optical module in FIG. 2 with an adaptor for an optical connector.

As shown in FIGS. 1 to 3, the optical module 11 is a multi-channel pluggable optical transceiver that can be attached to a network device (information system device) such as a switching hub and a media converter.

As described below, an example of a transmission optical transceiver is given that is of 12-channel type used for SNAP12 (12-channel parallel transmission optical module) standard and is to transmit 3 Gbit/s of signals per one channel. The optical module 11 converts plural electrical signals from network devices into optical signals, and parallel-transmits them into plural transmission optical fibers as a transmission line.

The optical module 11 is composed of a strip circuit board 12 as a single rigid board, and a transmitter optical subassembly (TOSA) 13 mounted on the circuit board 12. In this embodiment, the circuit board 12 is formed of heat-resistant glass base material-epoxy resin laminated plate (FR4).

On the bottom of one side (i.e., network device side) of the circuit board 12, an electrical connector 14 (in this embodiment, 100-pin electrical connector) is disposed for connecting the host board thereto. By fitting the electrical connector 14 into a female connector on the host board, the optical module 11 can be electrically connected to the host board. On the other side (i.e., fiber side) of the circuit board 12, plural (four in FIG. 1) through holes 5 for positioning the optical block 16 described later are formed. The through holes 5 are each formed to receive a fitting protrusion 6 of the optical block reinforcing member 1, and have a size slightly bigger than the fitting protrusion 6.

The transmitter optical subassembly 13 is composed of an LD element module 15 as a light emitting element for converting plural electrical signals from the circuit board 12 into optical signals, and an optical block (orthogonal optical path block) 16 that is optically coupled with the LD element module 15 such that optical signal emitted upward from the LD element module 15 is bent forward (diagonally to the lower left in FIGS. 1 to 3) to connect to the optical connector.

The LD element module 15 is composed of a VCSEL (vertical cavity surface emitting laser) array where 12 LD chips are arrayed in line. The LD element module 15 is mounted on the circuit board 12 such that optical signal can be emitted vertically upward. On the circuit board 12, transmission electronic parts such as a driver IC 17 and a capacitor 18 for driving the LD element module 15 are mounted other than the LD element module 15.

Figure 8:
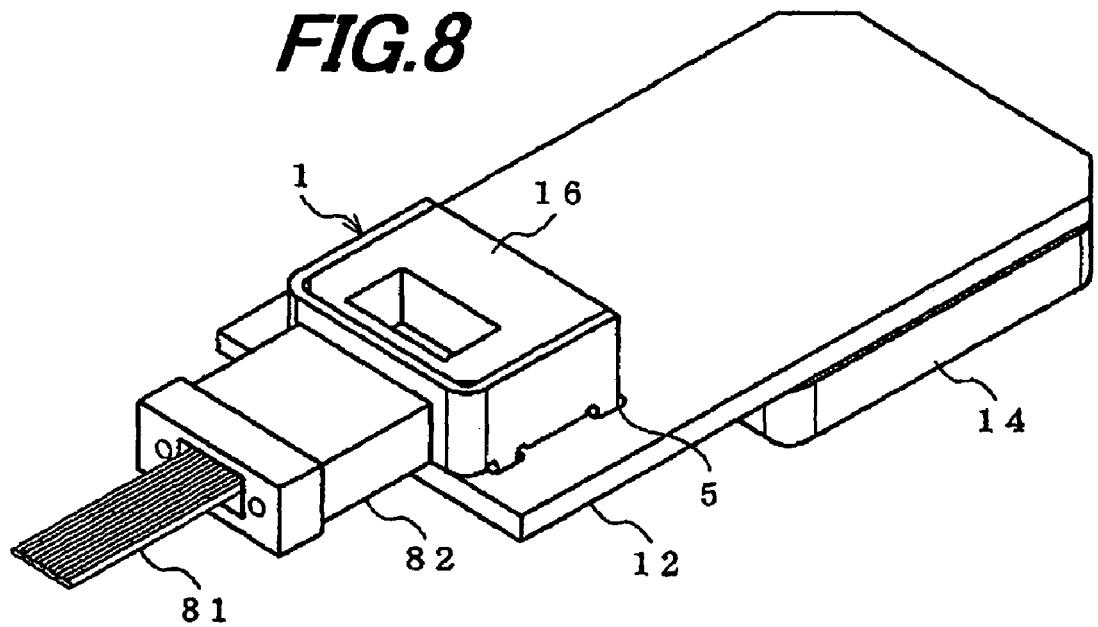
FIG. 8 is a perspective view showing an optical connector ferrule with optical fibers attached to the optical module in FIG. 2.

On the front surface of the optical block 16, as shown in FIG. 8, an MT (Mechanically transferable) ferrule 82 with an optical fiber 81 connected thereto is connected via the optical block reinforcing member 1 described later. The optical fiber 81 is a 12-core tape fiber.

The tape fiber is formed such that plural (twelve in FIG. 8) single-core optical fibers are arrayed in parallel and formed into a tape. In this embodiment, as the single-core optical fiber, a multimode fiber (MMF) is used that is suited to transmit optical signal in short distance, e.g., several tens of meters and easy to connect.

On the outer circumference of the MT ferrule 82, an adaptor 19 as shown in FIGS. 1 and 3 is disposed. The adaptor 19 and the MT ferrule 82 (See FIG. 8) compose an MPO (Multifiber Push-On: multicore bulk connection by using MT type optical connector).

Figure 7:
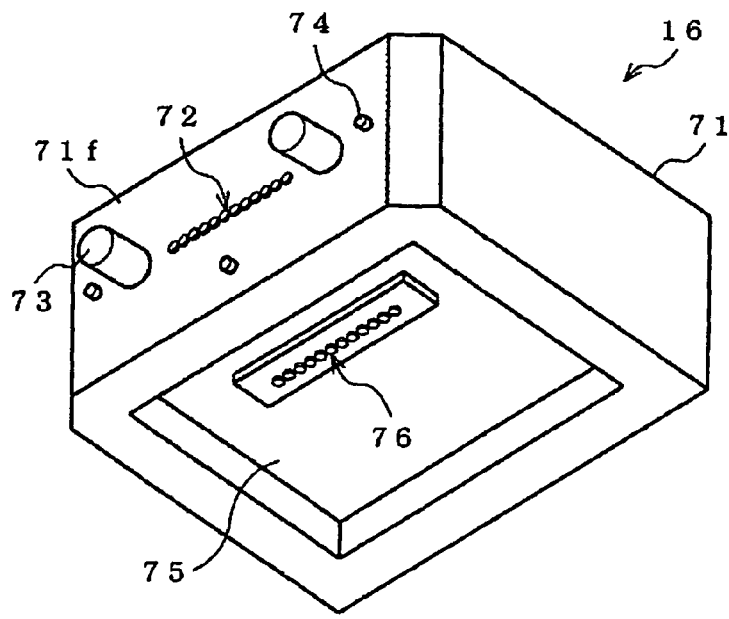
FIG. 7 is a perspective view showing the optical block in FIG. 6.

The optical block 16 is, as shown in FIG. 7, provided with a first lens array 72 with twelve lenses (microlenses) arrayed in line and each optically coupled with the single-core optical fiber of the optical connector at a center part of a front surface 71*f* of a block body 71 formed approximately rectangular.

On the front surface 71*f* of the block body 71, guide pins 73 are formed on both sides of the first lens array 72 such that they are fitted into corresponding guide holes of the MT ferrule 82 (See FIG. 8) for optically coupling the MT ferrule 82 with the optical block 16.

On the surface (front surface 71*f* in FIG. 7) of the optical block 16 on the connection side with the optical connector, plural (three in FIG. 7) protrusions 74 may be formed for positioning the optical block reinforcing member 1 which contacts the optical block 16.

Owing to the positioning protrusions 74, the positioning (parallel alignment) can be determined uniquely between a pressure-receiving surface R (See FIG. 1) of the optical block reinforcing member 1 and the first lens array 72 on the front surface 71*f* of the optical block 16, so as to have the good optical coupling with the optical connector. Meanwhile, in order to position the pressure-receiving surface R, the protrusions 74 are desirably three or more since the parallel alignment is difficult to have by the two protrusions 74.

At the bottom of the block body 71, a recessed portion 75 is formed for covering the LD element module 15 or transmission electronic parts to give a simple airtight seal. The depth of the recessed portion 75 is adjusted such that the LD element module 15 is located at a focal-distance position of a second lens array 76. On the top inside surface of the recessed portion 75, the second lens array 76 is disposed that 12 lenses are arrayed in line for optically coupling with the LD chips of the LD element module 15.

Figure 5:
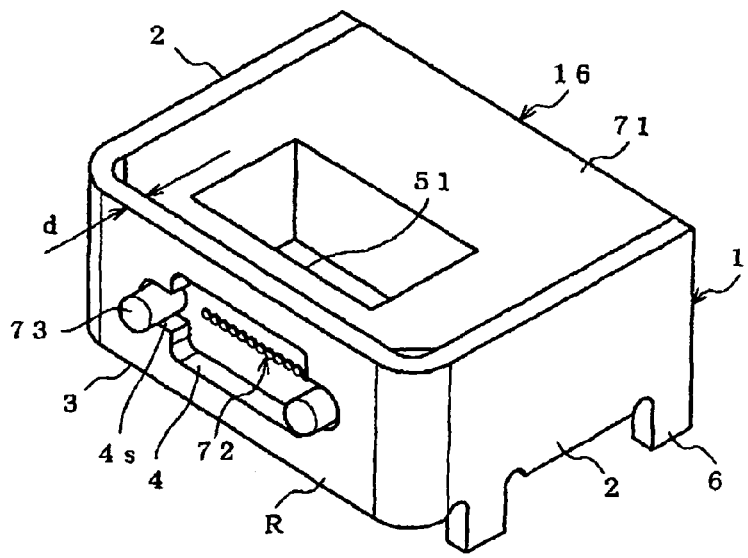
FIG. 5 is an enlarged perspective view showing the optical block and the optical block reinforcing member.

As shown in FIG. 5, a 45-degree mirror 51 is formed inside the block body 71 as a total reflection surface for changing the propagation direction of the optical signal. The optical block 16 as shown in FIG. 7 is integrally formed of a resin transparent to the optical signal.

As shown in FIGS. 1 to 3, 5 and 6, the optical block reinforcing member 1 of this embodiment is mounted on the circuit board 12 by being fitted to the optical block 16 although not integrated with the optical block 16. The optical block reinforcing member 1 is provided with the pressure-receiving surface R to be pressurized by the joint face (or connection face) of the optical connector when the optical connector is connected to the optical block 16.

In detail, the optical block reinforcing member 1 is composed of sidewalls 2, 2 for covering the sidewalls of the optical block 16, and a receiving wall (front wall) 3 for partially covering the front surface of the optical block 16. The optical block reinforcing member 1 is shaped like C so as to cover the sidewalls and front surface of the optical block 16.

At a center part of the receiving wall 3, an opening 4 is formed for passing through the optical signal from the first lens array 72 (or from the optical connector, in case of using a receiver optical subassembly (ROSA) instead of the transmitter optical subassembly 13), and the pressure-receiving surface R is formed at the front side of the receiving wall 3 and around the opening 4. At both ends of the opening 4, insert holes 4*s* are formed for receiving the guide pins 73 inserted thereinto.

Figure 6:
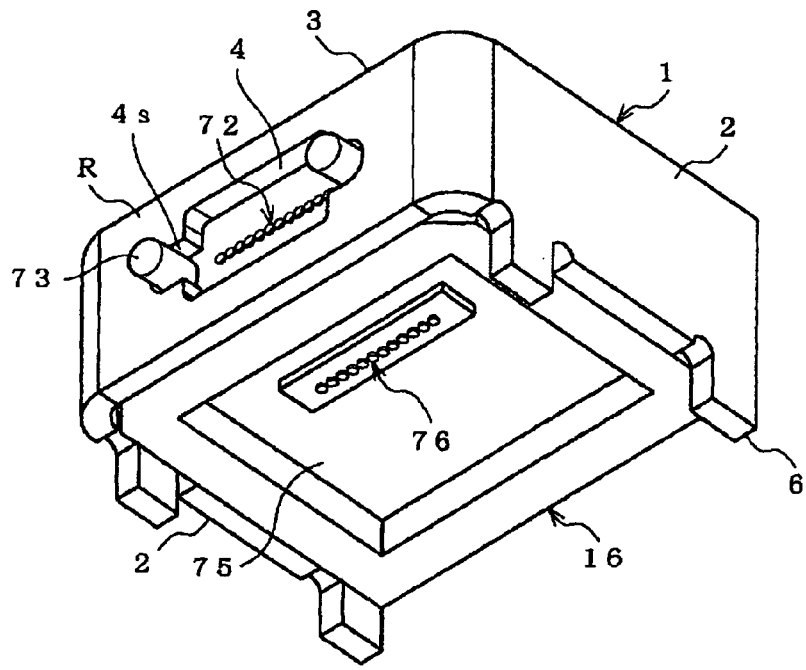
FIG. 6 is a perspective view showing the optical block and the optical block reinforcing member in FIG. 5 from below.

At the bottom of the sidewalls 2 of the optical block reinforcing member 1, plural (four in total, two at each side bottom as shown in FIG. 6) fitting protrusions 6 are formed for fitting into the four through holes 5 (See FIG. 1) formed in the circuit board 12.

The thickness d of the optical block reinforcing member 1 is determined such that the joint face of the optical connector is located at a focal position of the first lens array 72. In detail, provided that the distance from the front surface 71*f* of the optical block 16 to the focal point of light emitted from the first lens array 72 is focal distance D of the first lens array 72, if there is no protrusions 74 (See FIG. 7), d=D can be obtained. On the other hand, if there is the protrusions 74, d=D−(the protruding amount of the protrusions 74) can be obtained, where the protruding amount of the protrusions 74 means that from the front surface 71*f* of the optical block 16.

The optical block reinforcing member 1 may be formed of a metallic material such as SUS, springy steel and phosphor bronze etc. and integrally shaped by bending the metallic material by sheet processing or press molding.

Referring to FIGS. 9A to 9D, an assembly method (production method) of the optical module 11 will be explained below.

Figure 9A:
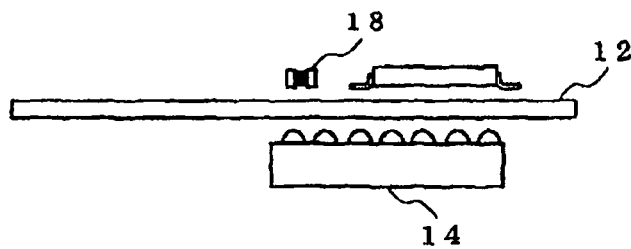
FIGS. 9A to 9D are schematic side views showing a method of making the optical module in FIG. 1.
Figure 9B:
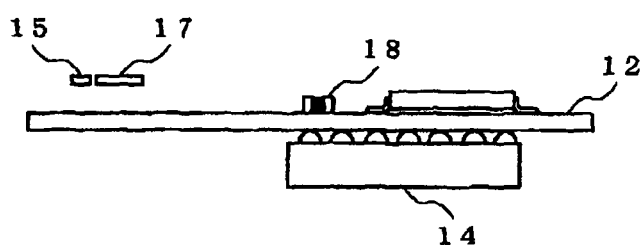
Figure 9C:
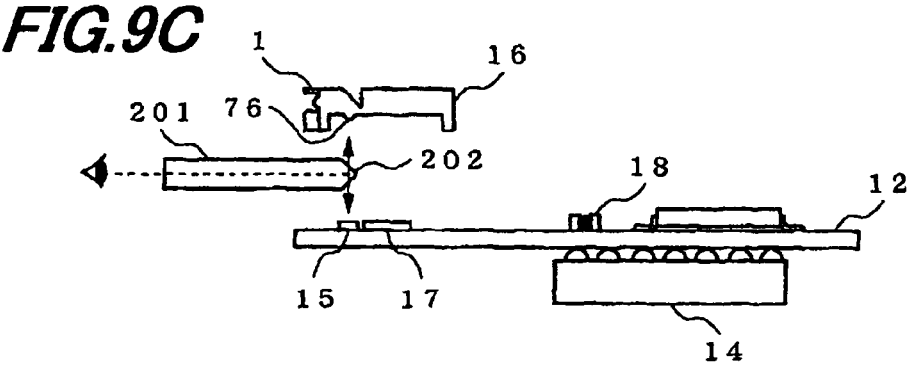

First, electronic parts such as capacitor 18 are mounted on the circuit board 12, and an electrical connector 14 is solder-mounted at the bottom of the circuit board 12 (See FIG. 9A). Then, the LD element module 15 and the driver IC 17 are mounted through conductive adhesives on the circuit board 12 (See FIG. 9B).

Then, soft (relatively soft after the hardening) adhesives S such as silicone-based adhesives is coated on the front and both sides of the optical block 16, and the optical block reinforcing member 1 is adhered to the optical block 16 such that the pressure-receiving surface R thereof faces outside. Then, UV (ultraviolet) curing adhesives U is coated on all the lower end of the optical block reinforcing member 1 (omitted in FIGS. 9C-9D) and the optical block 16. Aligning the optical block 16 while positioning the second lens array 76 to the apertures (openings or emission regions) of the LD element module 15 by using an aligning member 201, the fitting protrusions 6 of the optical block reinforcing member 1 are inserted into the through holes 5 of the circuit board 12 (See FIG. 9C).

The aligning member 201 used herein is an elongated member with a half mirror at its tip. It may be used for manually aligning by operator's eyes or for self-aligning by a marker attached to the optical block 16.

Then, the boundary portion (with the UV curing adhesives U coated thereon) between the optical block reinforcing member 1/optical block 16 and the circuit board 12 is UV-irradiated for curing the adhesives U and temporarily fixed, upon which the positioning can be conducted. Then, it is thermally cured (secured). Then, a hard (relatively hard after the hardening) adhesives R such as filler-containing adhesive is filled in a gap between the fitting protrusion 6 of the optical block reinforcing member 1 and the though hole 5 of the circuit board 12, so that the optical block reinforcing member 1 and the optical block 16 are securely bonded and mounted on the circuit board 12 (See FIG. 2). In the meanwhile, for improving the workability, the adhesives R may be filled into the through hole 5 from the bottom side of the circuit board 12.

Figure 4A:
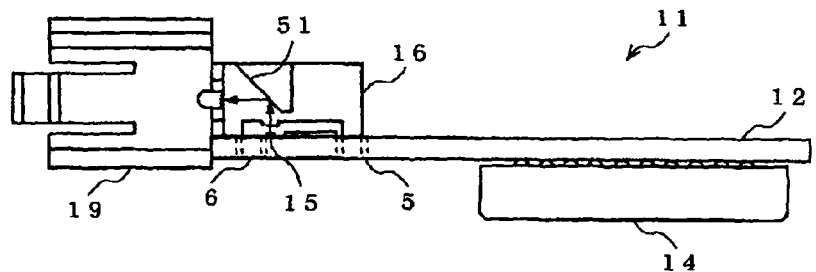
FIG. 4A is a cross sectional view cut along the longitudinal center line of the optical module in FIG. 1.
Figure 9D:
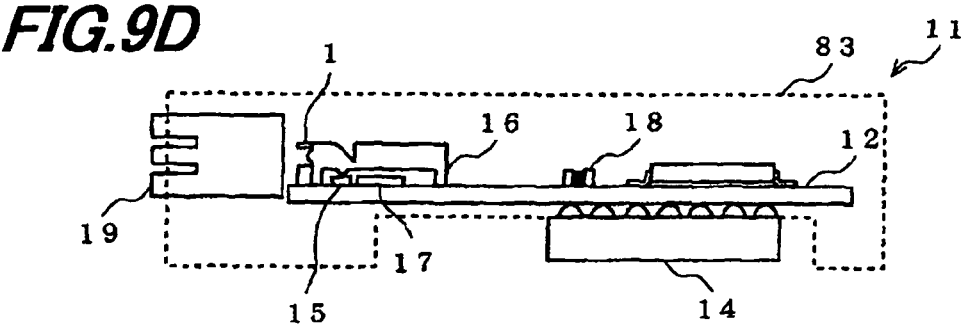
Figure 10:
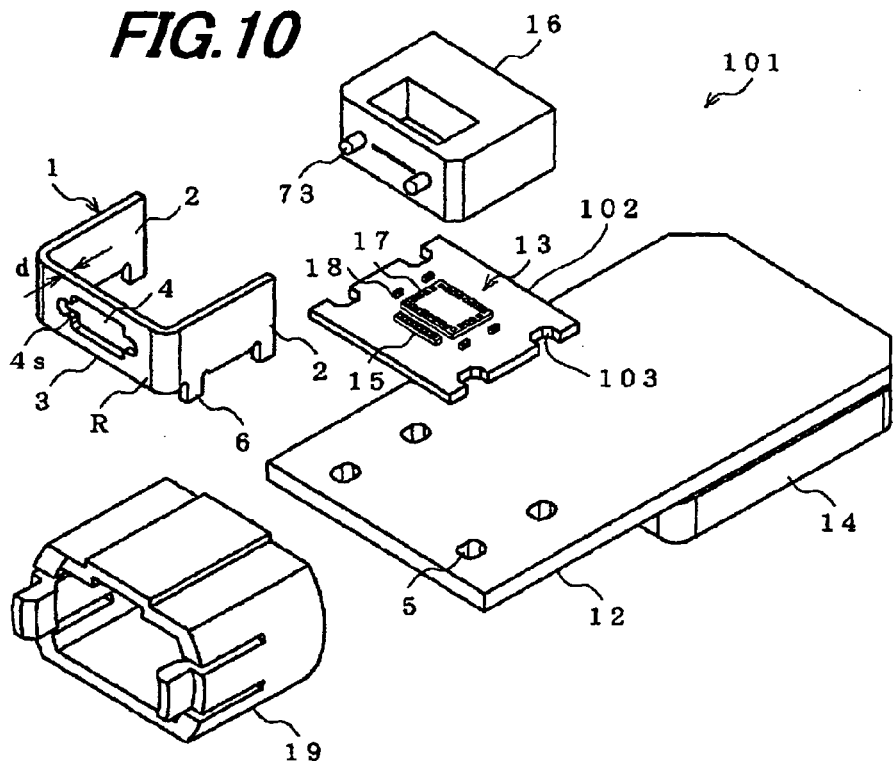
FIG. 10 is an exploded perspective view showing a main part of an optical module using an optical block reinforcing member in a second preferred embodiment according to the invention.
Figure 11:
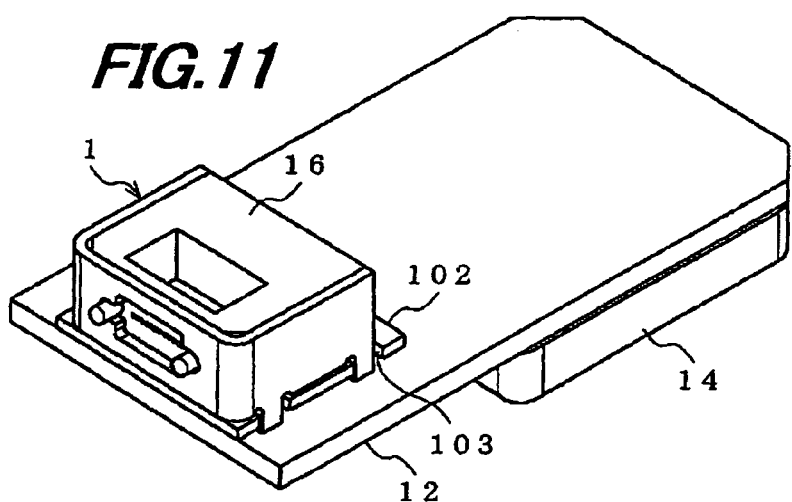
FIG. 11 is a perspective view showing the optical module in FIG. 10 where an optical block and the optical block reinforcing member are mounted on a circuit board.
Figure 12:
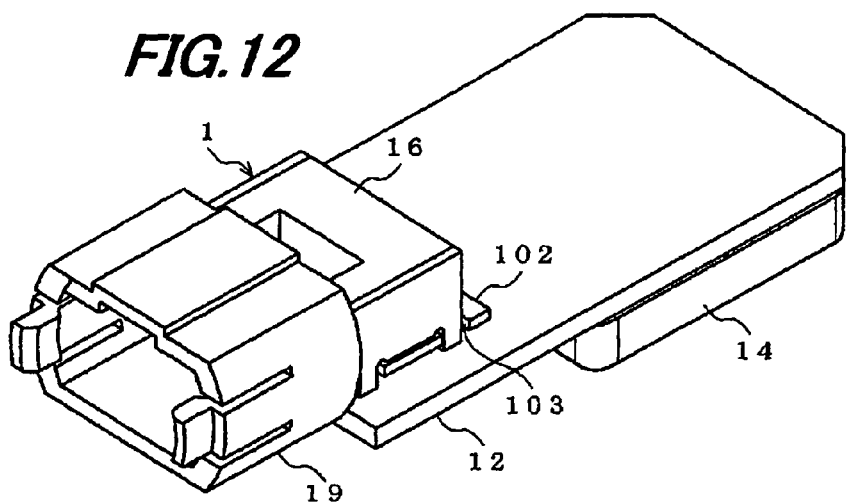
FIG. 12 is a perspective view showing the optical module in FIG. 11 with an adaptor for an optical connector.
Figure 13:
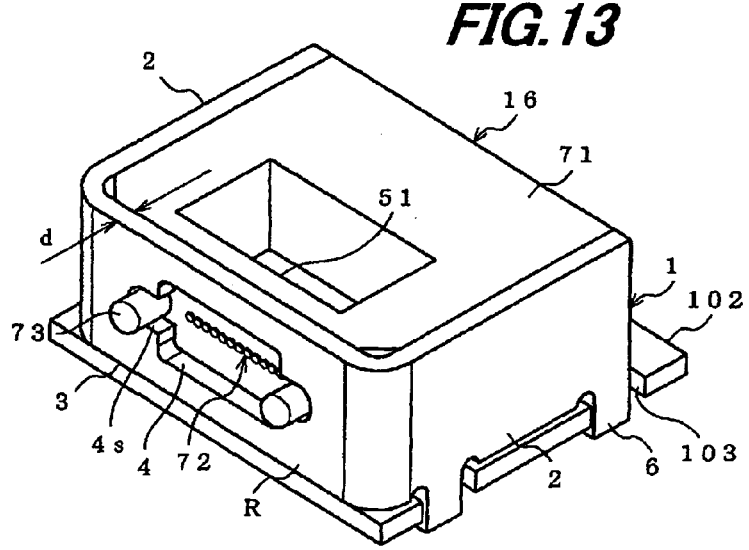
FIG. 13 is an enlarged perspective view showing the optical block, the optical block reinforcing member and a sub-board.

Then, the adaptor 19 is attached to a casing 83 (e.g., housing based on SNAP1 2 standard) that is formed of a high heat dissipation material such as Zn and Al and has an opening at the bottom (See FIG. 9D and FIG. 4A). Finally, in the casing 83, the circuit board 12 with the parts such as the optical block reinforcing member 1 mounted thereon is housed for completing the optical module 11.

The effects and functions of the embodiment will be explained below.

First, the operation of the optical module 11 will be briefly described below.

In using the optical module 11, as shown in FIG. 8, the MT ferrule 82 with the optical fiber 81 connected thereto is further optically coupled through the optical block reinforcing member 1 to the optical block 16.

Figure 4B:
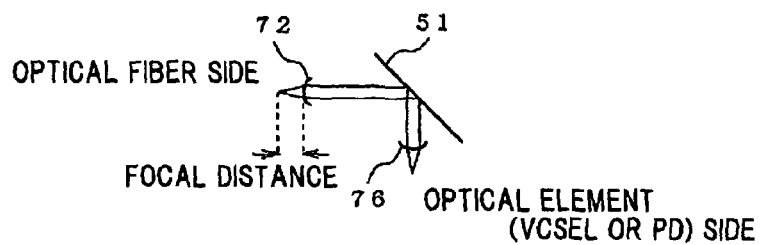
FIG. 4B is a diagram illustrating the propagation behavior of optical signal.

Twelve transmission electrical signals from a network device are, as shown in FIGS. 4A-4B, converted by the LD element module 15 into twelve optical signals. The optical signals are changed upward to forward in travelling direction by the 45-degree mirror 51 formed in the optical block 16, pass through the opening 4 of the optical block reinforcing member 1, and are inputted into the optical fiber 81.

The pressing force F applied when connecting the optical connector to the optical block 16 is as strong as 6.8 to 12.8 N at the front face of the optical block 16. The optical block reinforcing member 1 receives all of the pressing force F at the pressure-receiving surface R which is the butted surface for the optical connector. Thus, the pressing force F applied to the optical block 16 can be significantly reduced by the optical block reinforcing member 1. Therefore, the optical block 16 can be prevented from being distorted or deformed so that the focal position of the lenses can be unchanged for providing the good optical coupling.

Since the optical block reinforcing member 1 can be disposed separately from the optical block 16 on the circuit board 12, it can be also applied to the conventional optical module substantially without the design changes of the optical block 16.

By combining the optical block reinforcing member 1 with the circuit board 12 as a rigid board and the optical block 16, the optical module 11 can be structured such that no stress occurs at the connection portion between the optical block 16 and the circuit board 12. Furthermore, the optical module 11 can be produced inexpensively with high reliability.

As described above, the optical block reinforcing member 1 is composed of the receiving wall 3 with the pressure-receiving surface R, and the sidewalls 2, 2 covering both sides of the optical block 16. Thus, the optical block reinforcing member 1 can have sufficient strength although lightweight and low-profile, and it can be easy to attach to the optical block 16.

Further, the optical block reinforcing member 1 is provided with the fitting protrusions 6 for engaging with the through holes 5 of the circuit board 12. Thus, the pressing force F during the connection of the optical connector can be also distributed to the fitting protrusions 6 and the circuit board 12. Therefore, the optical module 11 can have higher reliability.

Also, the mounting (or positioning) of the optical block reinforcing member 1 and the optical block 16 on the circuit board 12 can be facilitated.

The optical block 16 is provided with the protrusions 74 at the front surface. Thus, even when the optical block reinforcing member 1 is a little deformed by the pressuring force of the optical connector, the entire optical block 16 can be prevented from being distorted since the protrusions 74 can be deformed thereby. Therefore, the pressing force F during the connection of the optical connector can be further reduced.

Since the optical block reinforcing member 1 is formed of a metal material, it can be easily integrally shaped by sheet processing or press molding.

Second Embodiment

An optical module in a second preferred embodiment of the invention will be explained that uses the optical block reinforcing member 1.

As shown in FIGS. 10 to 13, the optical module 101 of this embodiment is provided with a sub-board 102 made of ceramics such as alumina in addition to the components of the optical module 11 (of the first embodiment) as shown in FIGS. 1 to 8. In other words, the optical module 101 is formed such that the LD element module 15 and the electronic parts are mounted on the sub-board 102 and the sub-board 102 is disposed between the optical block reinforcing member 1 and the circuit board 12.

The sub-board 102 is formed of a material (e.g., ceramics with a Young's modulus higher than the circuit board 12) harder than the circuit board 12. It has a size sufficient to allow all of the optical block 16 with the optical block reinforcing member 1, the optical parts and electrical parts to be mounted thereon. The sub-board 102 is provided with plural (four in FIG. 10) notched grooves 103, each of which has a size bigger than the through hole 5 of the circuit board 12, at both sides thereof.

The optical module 101 can be assembled in the same way as shown in FIGS. 9A to 9D except that the sub-board 102 is previously bonded through conductive adhesives on the circuit board 12.

The optical module 101 is formed such that the pressing force F during the connection of the optical connector can be also distributed to the sub-board 102. Thus, the optical block 16 can be further prevented from being distorted or deformed.

In the above embodiments, the optical modules 11 and 101 are exemplified that have the circuit board 12 with the electrical connector 14 and are used based on the SNAP12 standard. However, the optical modules 11 and 101 may be formed such that they comprise a circuit board with a card-edge connector at other end for applying to XENPAK (optical transceiver operated corresponding to the 10 Gbps Ethernet (registered trademark) interface based on the IEEE802.3), X2 (small optical transceiver following the XENPAK), and XFP (optical transceiver adapted for 10 Gbps and using a serial interface) that are pluggable to a network device.

In the above embodiments, the optical modules are exemplified as the transmission optical transceiver. However, by replacing the LD element module 15 with a PD array and the driver IC 17 with a preamplifier IC for amplifying signals from the PD array, they can be applied to a reception optical transceiver. It is of course applicable to a transmission/reception optical transceiver in like manner.

The assembly method of the optical module 11 as shown in FIGS. 9A to 9D is exemplified such that the optical block reinforcing member 1 is previously attached to the optical block 16 for mounting the optical block reinforcing member 1 and the optical block 16 on the circuit board 12 easily with high precision. Alternatively, the optical block reinforcing member 1 may be mounted on the circuit board 12 prior to attaching the optical block 16 to the optical block reinforcing member 1 or the optical block 16 may be mounted on the circuit board 12 prior to attaching the optical block reinforcing member 1 to the optical block 16.

Third Embodiment

Figure 14:
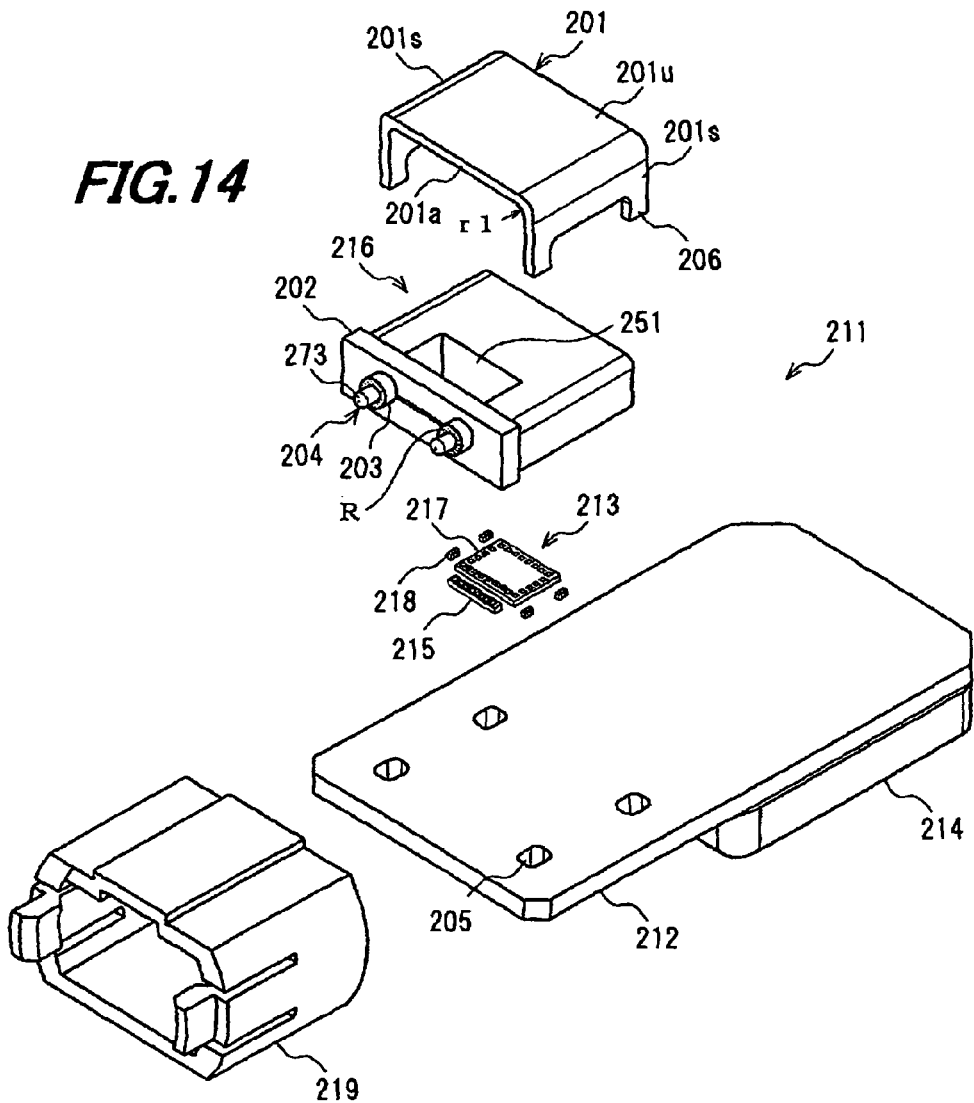
FIG. 14 is an exploded perspective view showing a main part of an optical module using an optical block reinforcing member in a third preferred embodiment according to the invention.
Figure 15:
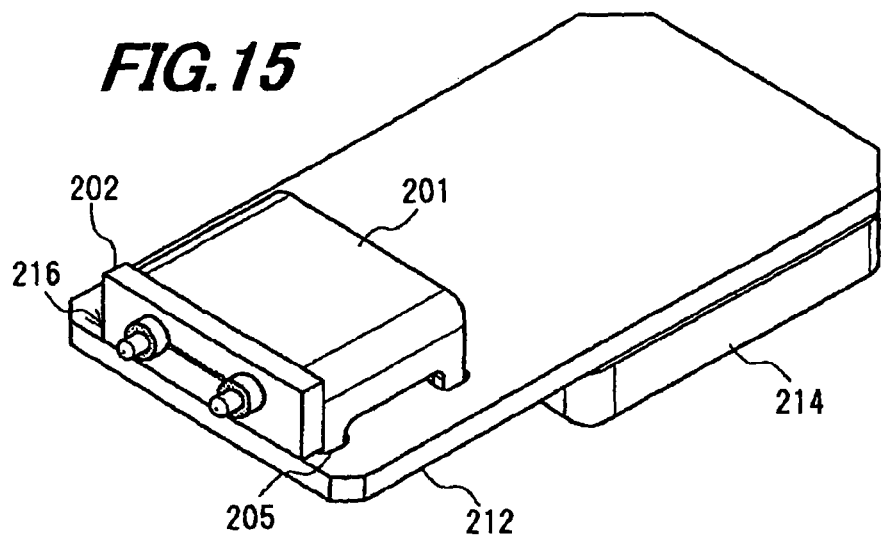
FIG. 15 is a perspective view showing the optical module in FIG. 14 where an optical block and the optical block reinforcing member are mounted on a circuit board.
Figure 16:
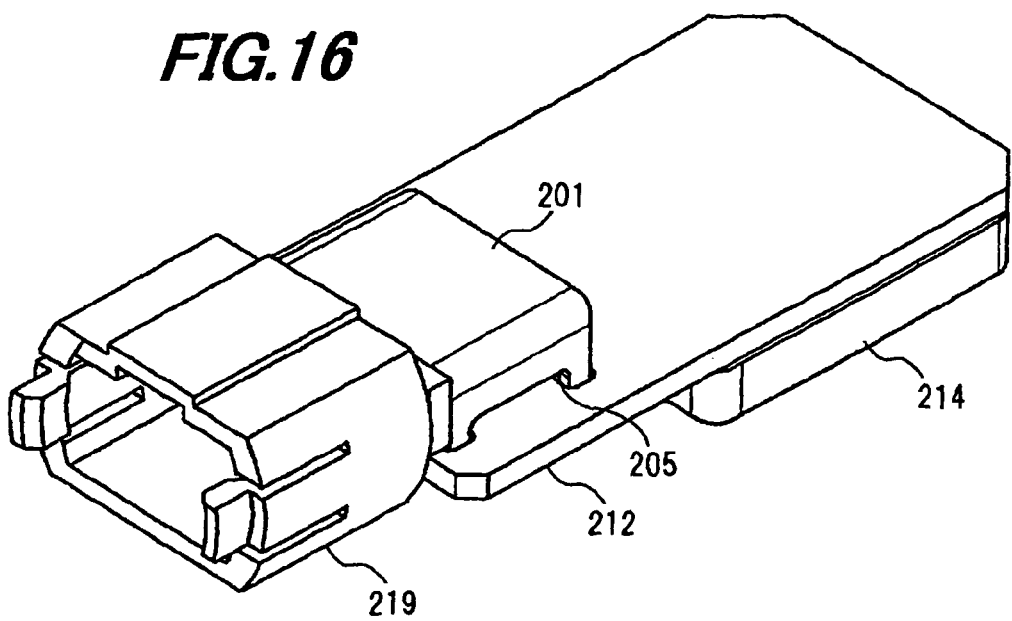
FIG. 16 is a perspective view showing the optical module in FIG. 15 with an adaptor for an optical connector.

Referring to FIGS. 14 to 16, an optical module in a third preferred embodiment of the invention will be explained that uses an optical block reinforcing member 1.

FIG. 14 is an exploded perspective view showing a main part of the optical module using the optical block reinforcing member in the third preferred embodiment according to the invention. FIG. 15 is a perspective view showing the optical module in FIG. 14 where an optical block and the optical block reinforcing member are mounted on a circuit board. FIG. 16 is a perspective view showing the optical module in FIG. 15 with an adaptor for an optical connector.

As shown in FIGS. 14 to 16, the optical module 211 is a multi-channel pluggable optical transceiver that can be attached to a network device (information system device) such as a switching hub and a media converter.

As described below, an example of a transmission optical transceiver is given that is of 12-channel type used for SNAP12 (12-channel parallel transmission optical module) standard and is to transmit 3 Gbit/s of signals per one channel. The optical module 211 converts plural electrical signals from network devices into optical signals, and parallel-transmits them into plural transmission optical fibers as a transmission line.

The optical module 211 is composed of a strip circuit board 212 as a single rigid board, and a transmitter optical subassembly (TOSA) 213 mounted on the circuit board 212. In this embodiment, the circuit board 212 is formed of heat-resistant glass base material-epoxy resin laminated plate (FR4).

On the bottom of one side (i.e., network device side) of the circuit board 212, an electrical connector 214 (in this embodiment, 100-pin electrical connector) is disposed for connecting the host board thereto. By fitting the electrical connector 214 into a female connector on the host board, the optical module 211 can be electrically connected to the host board. On the other side (i.e., fiber side) of the circuit board 212, plural (four in FIG. 1) through holes 205 for positioning the optical block 216 described later are formed.

After a fitting protrusion 206 of the optical block reinforcing member 201 is inserted into the through holes 205, an adhesive is filled thereinto and then hardened to fix the optical block 116 to the circuit board 112.

The transmitter optical subassembly 213 is composed of an LD element module 215 as a light emitting element for converting plural electrical signals from the circuit board 212 into optical signals, and an optical block (orthogonal optical path block) 216 that is optically coupled with the LD element module 215 such that optical signal emitted upward from the LD element module 215 is bent forward (diagonally to the lower left in FIGS. 14 to 16) to connect to the optical connector.

The LD element module 215 is composed of a VCSEL (vertical cavity surface emitting laser) array where 12 LD chips are arrayed in line. The LD element module 215 is mounted on the circuit board 212 such that optical signal can be emitted vertically upward. On the circuit board 212, transmission electronic parts such as a driver IC 217 and a capacitor 218 for driving the LD element module 125 are mounted other than the LD element module 215.

Figure 21:
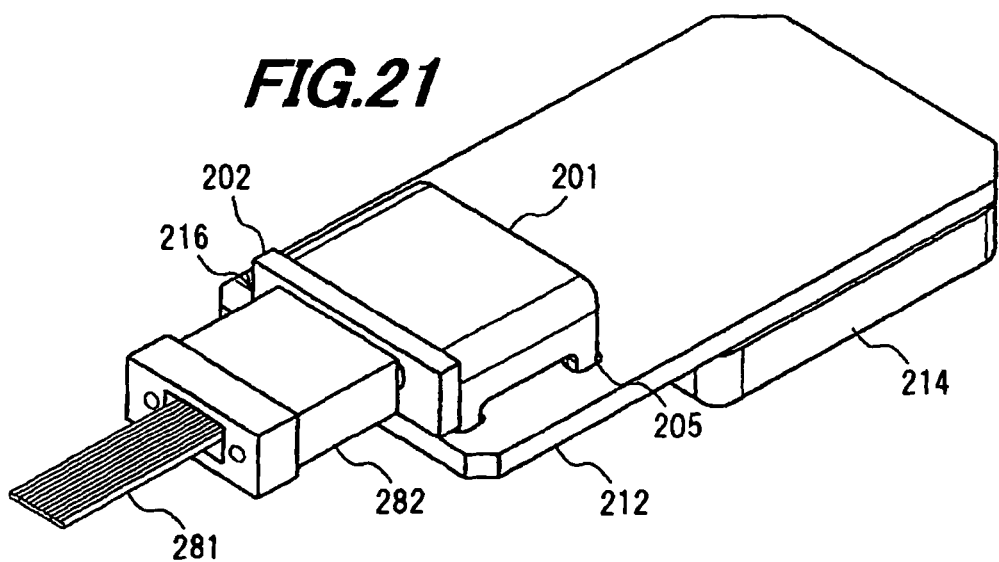
FIG. 21 is a perspective view showing an optical connector ferrule with optical fibers attached to the optical module in FIG. 15.
Figure 22:
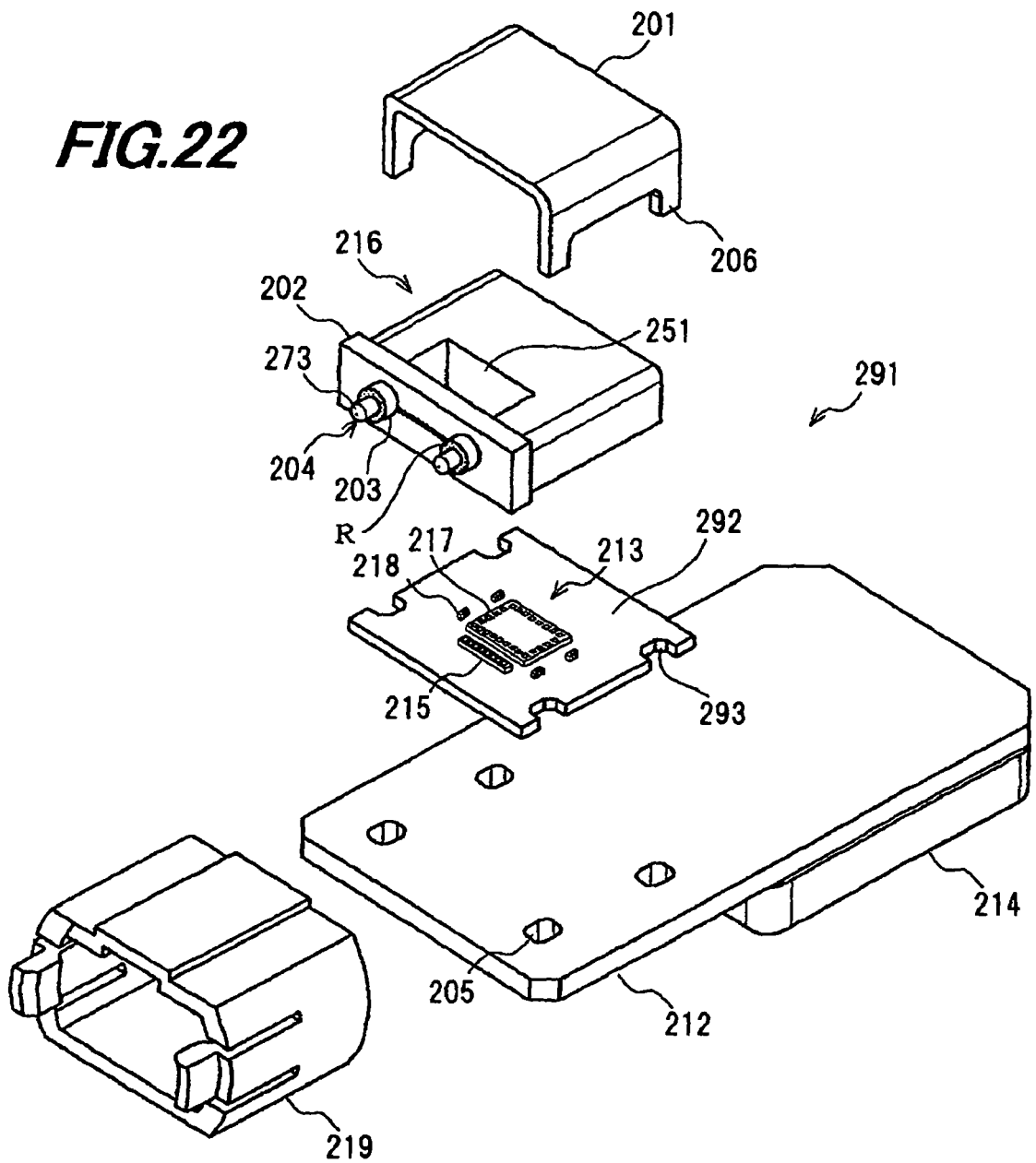
FIG. 22 is an exploded perspective view showing a main part of an optical module using an optical block reinforcing member in a fourth preferred embodiment according to the invention.
Figure 23:
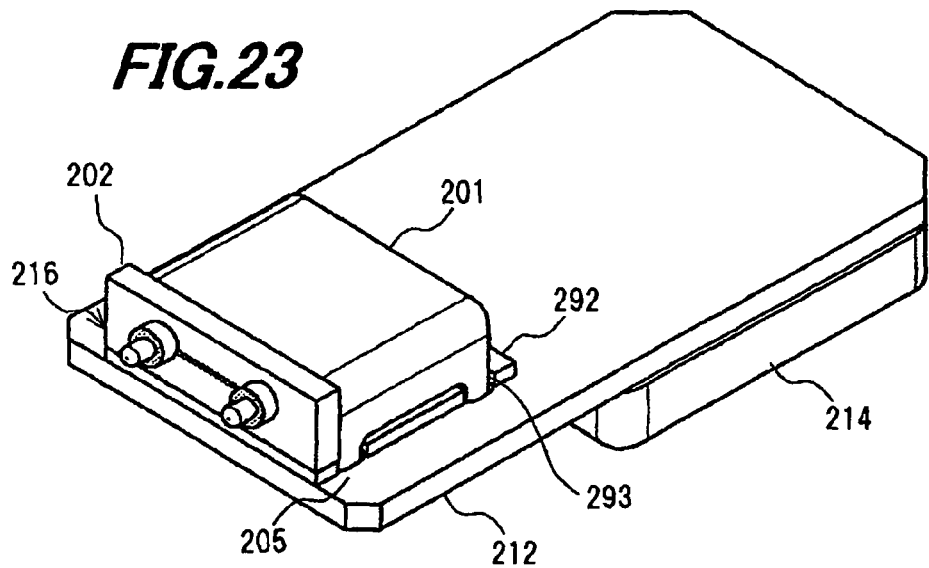
FIG. 23 is a perspective view showing the optical module in FIG. 22 where an optical block and the optical block reinforcing member are mounted on a circuit board.
Figure 24:
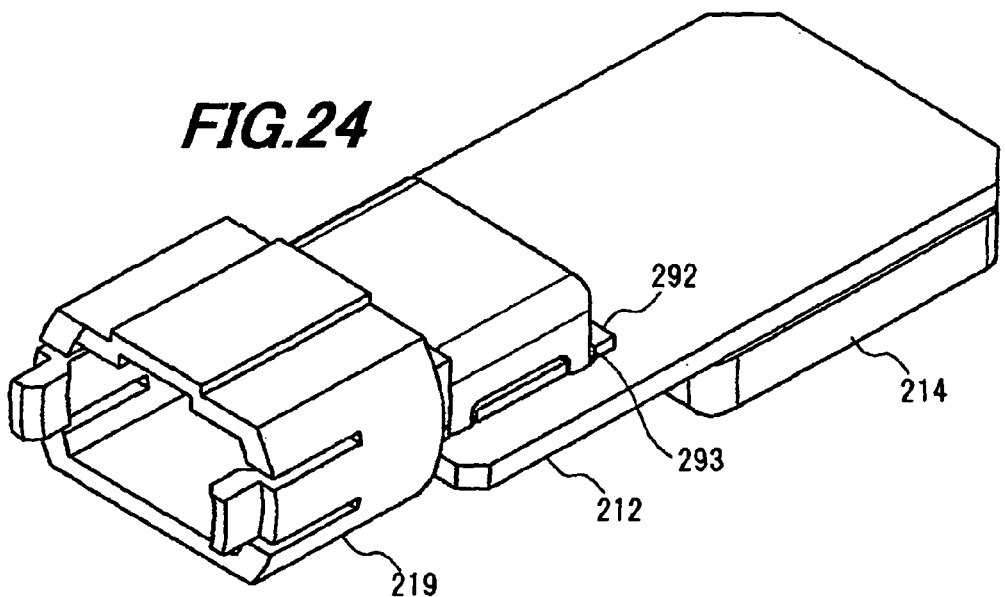
FIG. 24 is a perspective view showing the optical module in FIG. 23 with an adaptor for an optical connector.
Figure 25:
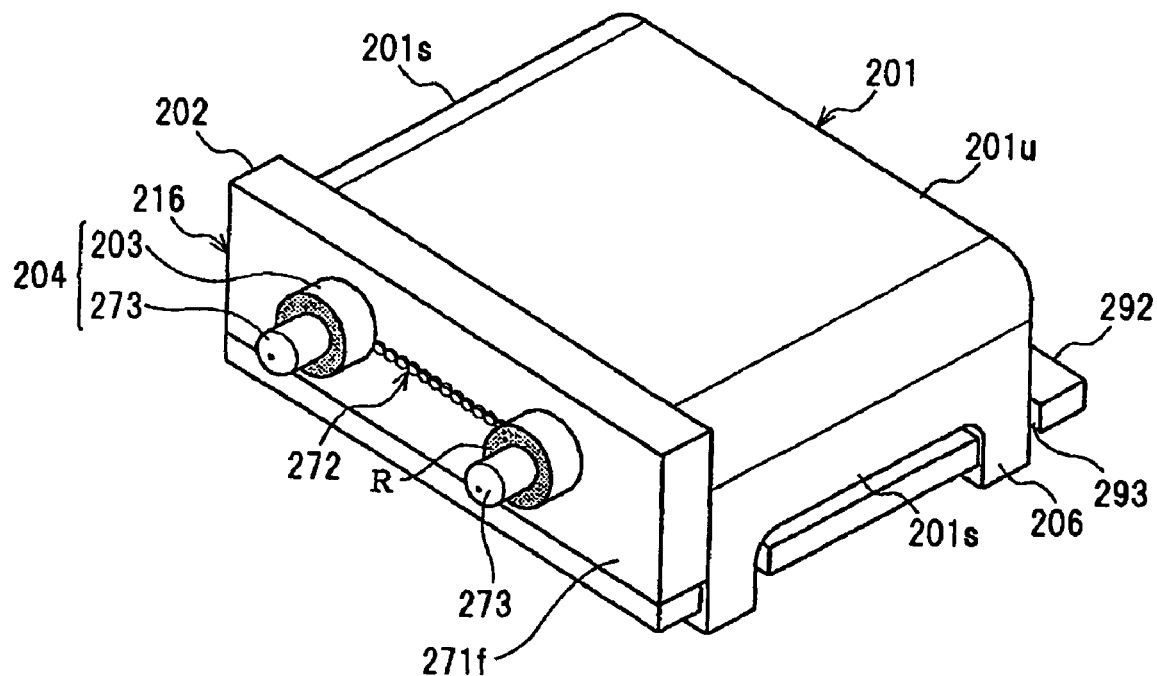
FIG. 25 is an enlarged perspective view showing the optical block, the optical block reinforcing member and a sub-board.

On the front surface of the optical block 216, as shown in FIG. 21, an MT (Mechanically transferable) ferrule 282 with an optical fiber 281 connected thereto is connected via the optical block reinforcing member 201 described later. The optical fiber 281 is a 12-core tape fiber.

The tape fiber is formed such that plural (twelve in FIG. 21) single-core optical fibers are arrayed in parallel and formed into a tape. In this embodiment, as the single-core optical fiber, a multimode fiber (MMF) is used that is suited to transmit optical signal in short distance, e.g., several tens of meters and easy to connect.

On the outer circumference of the MT ferrule 282, an adaptor 219 as shown in FIGS. 14 and 16 is disposed. The adaptor 219 and the MT ferrule 282 (See FIG. 21) compose an MPO (Multifiber Push-On: multicore bulk connection by using MT type optical connector).

The optical block 216 of the third embodiment will be detailed below.

Figure 20:
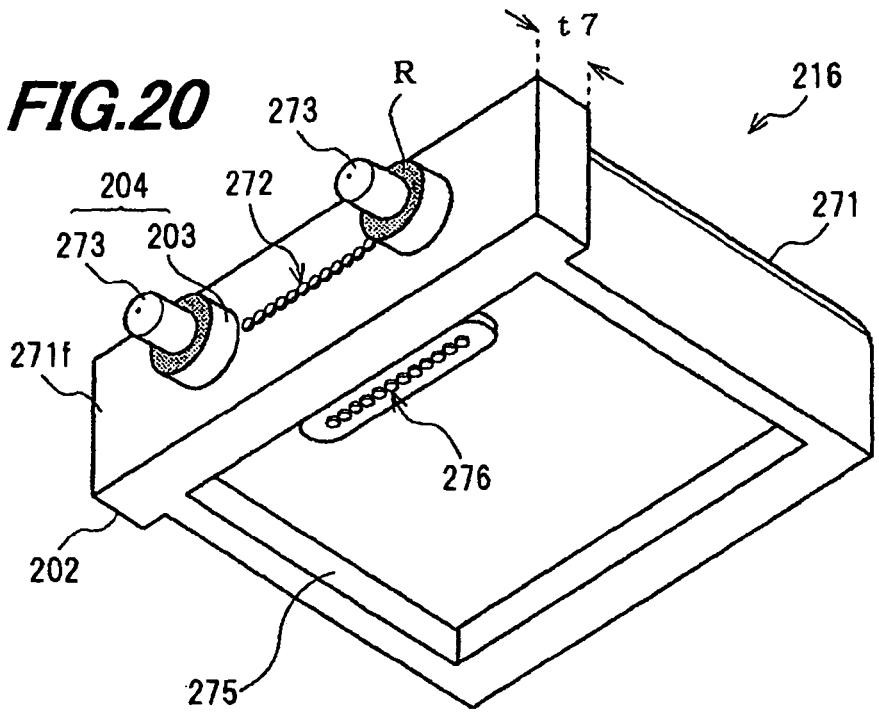
FIG. 20 is a perspective view showing the optical block in FIG. 19.

The optical block 216 is, as shown in FIG. 20, provided with a first lens array 272 with twelve lenses (microlenses) arrayed in line and each optically coupled with the single-core optical fiber of the optical connector at a center part of a front surface 271f of a block body 271 formed approximately rectangular.

On the front surface 271f of the block body 271, cylindrical guide pins 273 are formed on both sides of the first lens array 272 such that they are each fitted into corresponding guide holes of the MT ferrule 282 (See FIG. 21) for optically coupling the MT ferrule 282 with the optical block 216. The guide pins 273 each are formed protruding (standing) toward the optical connector from the front surface 271f of the block body 271. In this embodiment, the guide pins 273 have a diameter of $\phi=0.7$ mm.

The guide pins 273 are each fitted into the corresponding guide holes of the MT ferrule 282 (See FIG. 21) of the optical connector so that the MT ferrule 282 are optically coupled with the optical block 216.

At the bottom of the block body 271, a recessed portion 275 is formed for covering the LD element module 215 or transmission electronic parts to give a simple airtight seal. The depth of the recessed portion 275 is adjusted such that the LD element module 215 is located at a focal-distance position of a second lens array 276. On the top inside surface of the recessed portion 275, the second lens array 276 is disposed that 12 lenses are arrayed in line for optically coupling with the LD chips of the LD element module 215.

As shown in FIG. 14, a 45-degree mirror 251 is formed inside the block body 271 as a total reflection surface for changing the propagation direction of the optical signal.

As shown in FIGS. 14 and 15 and 18 to 20, the optical block reinforcing member 201 is provided with a receiving surface R for receiving the MT ferrule 282 (See FIG. 21) and defining the focal distance of the first lens array 272 when the optical connector is connected to the optical block 216. The receiving surface R is integrally formed with the block body 271. When the optical connector is connected to the optical block 216 by fitting the MT ferrule 282 into the optical block 216, the receiving surface R contacts the joint surface of the MT ferrule 282.

The optical block 216 further comprises a stopper portion 202 for stopping itself against the optical block reinforcing member 201, where the stopper portion 202 is shaped in accordance with the optical block reinforcing member 201 for reinforcing the optical block 216 of the optical module 211.

The stopper portion 202 is also called an engagement portion since the optical block 216 is thereby engaged with the optical block reinforcing member 201 when the optical block reinforcing member 201 is mounted on the circuit board 212. The front face of the stopper portion 202 corresponds to the front surface 271f of the block body 271. The thickness t7 (See FIG. 20) of the stopper portion 202 is made to be a little thicker (e.g., 0.3 to 1 mm) than the thickness t5 (See FIG. 18) of the optical block reinforcing member 201 described later.

Furthermore, on the periphery of the root of the guide pin 273, a cylindrical receiving portion 203 is formed that protrudes toward the optical connector side from the stopper portion 202 and has the receiving surface R on its top surface. The receiving portion 203 and the guide pin 273 compose a protrusion 204.

The protruding amount D of the receiving portion 203 is set to be the focal distance of the first lens array 272, i.e., the distance from the front surface 271f of the optical block 216 to the focal point of light emitted from the first lens array 272. Due to this, the joint face of the MT ferrule 282 (See FIG. 21) of the optical connector is located at the focal position of the first lens array 272 for providing the good optical coupling.

The optical block reinforcing member 201 is stopped against the stopper portion 202 described later from a direction opposite to the connecting direction of the optical connector, and attached to the optical block 216 on the circuit board 212. The optical block reinforcing member 201 is composed of sidewalls 201s, 201s for covering the sidewalls of the optical block 216, and an upper lid 201u for covering the top surface of the optical block 216. The optical block reinforcing member 201 is shaped like C so as to cover the sidewalls and top surface of the optical block 216.

The optical block reinforcing member 201 is attached to the optical block 216 from the direction (upward in FIG. 14) orthogonal to the direction (from diagonally to the lower left to diagonally to the upper right in FIG. 14) of the pressing force during the connection of the optical connector, for covering the optical block 216, and then bonded through adhesives to the optical block 216.

At the bottom of the sidewalls 201s of the optical block reinforcing member 201, plural (four in total, two for each sidewall 201s in this embodiment) fitting protrusions 206 are formed for fitting into the four through holes 205 (See FIG. 14) formed in the circuit board 212.

The optical block reinforcing member 201 may be formed of a metallic material such as SUS, springy steel and phosphor bronze etc. and integrally shaped by bending the metallic material by sheet processing or press molding.

In case of shaping the optical block reinforcing member 201 by sheet processing or press molding, the thickness t5 (See FIG. 18) of the optical block reinforcing member 201 is preferably 0.3 mm to 0.5 mm.

The bending (curvature radius) r of the sheet-processed or press-molded product is substantially the same as the thickness t5. As the thickness t5 increases, the processing becomes difficult due to the increased bending r although the products are reinforced. Thus, since the size of parts (i.e., the optical block 216 in this embodiment) housed in the sheet-processed or press-molded product needs to be reduced due to the increment of the bending r, the manufacturing thereof becomes difficult.

As such, in this embodiment, both the thickness t5 and the bending r1 (See FIG. 14) of the optical block reinforcing member 201 are set to be 0.3 mm to 0.5 mm.

Figure 18:
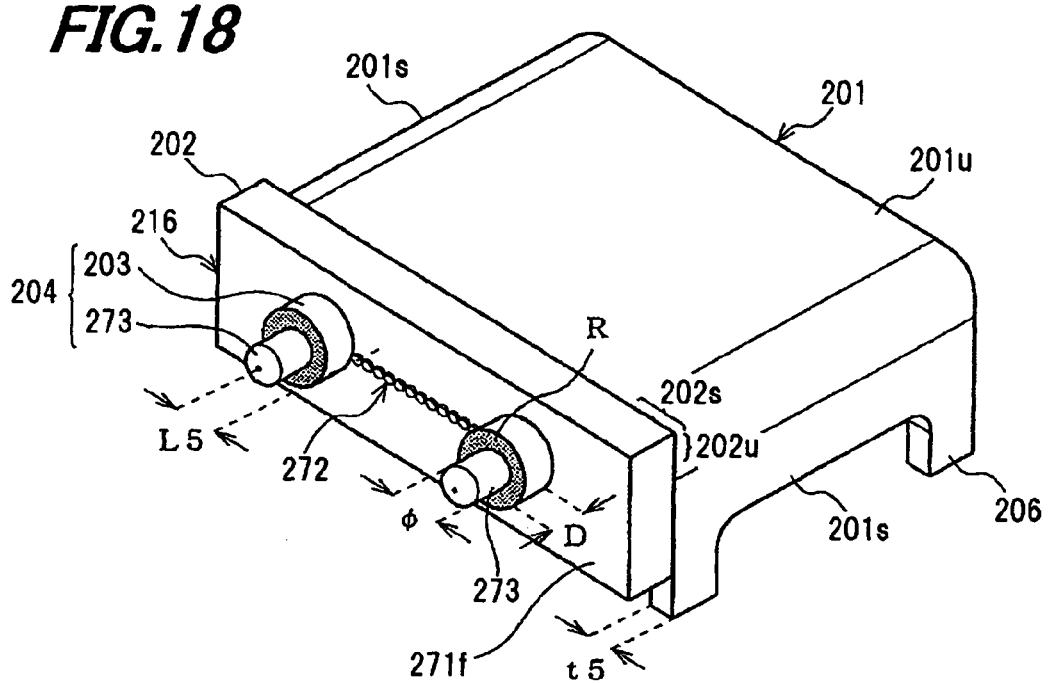
FIG. 18 is an enlarged perspective view showing the optical block and the optical block reinforcing member.
Figure 19:
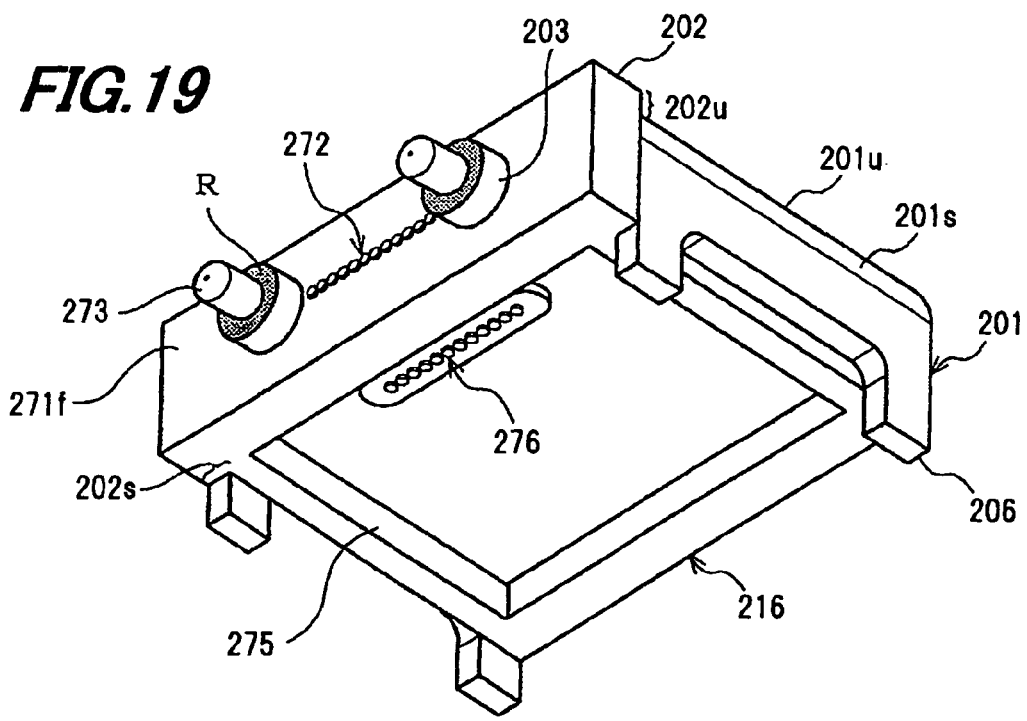
FIG. 19 is a perspective view showing the optical block and the optical block reinforcing member in FIG. 18 from below.

The stopper portion 202 is provided with an upper stopper portion 202u formed at the front top of the optical block 216 and a side stopper portion 202s formed at both front sides of the optical block 216 (See FIGS. 18-19). The height of the upper stopper portion 202u is equal to or more than the thickness of the upper lid 201u of optical block reinforcing member 201. The width of the side stopper portion 202s is equal to or more than the thickness of the sidewalls 201s of optical block reinforcing member 201.

Thus, when the optical block reinforcing member 201 is attached to the optical block 216, the stopper portion 202 is in height equal to or higher than the upper lid 201u of the optical block reinforcing member 201, in width equal to or wider than the side surface of the sidewalls 201s thereof, and shaped like a plate on the whole. In other words, the height of the upper stopper portion 202u and the width of the side stopper portion 202s may be formed to allow the engagement of the optical block reinforcing member 201 with the stopper portion 202 of the optical block reinforcing member 201.

The optical block 216 as described above is composed of the first lens array 272, the second lens array 276, the guide pins 273, the receiving portions 203 and the 45-degree mirror 251 that are integrally formed of a resin.

An assembly method (production method) of the optical module 211 will be explained below.

First, electronic parts such as capacitor 218 are mounted on the circuit board 212, and the electrical connector 214 is solder-mounted at the bottom of the circuit board 212. Then, the LD element module 215 and the driver IC 217 are mounted through conductive adhesives on the circuit board 212.

Then, an adhesive is coated on the top and both sides of the optical block 216, and the optical block reinforcing member 201 is adhered to the optical block 216 such that it covers the top and both sides of the optical block 216. In this step, the front face (C-shaped as shown in FIG. 14) of the optical block reinforcing member 201 is butted against the top back face of the stopper portion 202 of the optical block 216.

Then, UV (ultraviolet) curing adhesive U is coated on all the lower end of the optical block reinforcing member 201 and the optical block 216. After the fitting protrusions 206 of the optical block reinforcing member 201 are inserted into the through holes 205 of the circuit board 212, the optical block 216 is aligned while positioning the second lens array 276 to the apertures (openings or emission regions) of the LD element module 215 by using an aligning member and a known method.

Then, the boundary portion (with the UV curing adhesives U coated thereon) between the optical block reinforcing member 201/optical block 216 and the circuit board 212 is UV-irradiated for curing the adhesives U and temporarily fixed, upon which the positioning can be conducted. Then, the temporarily fixed part is thermally cured (secured) by heating. Then, a hard (relatively hard after the hardening) adhesives such as filler-containing adhesive is filled in a gap between the fitting protrusion 206 of the optical block reinforcing member 201 and the though hole 205 of the circuit board 212, so that the optical block reinforcing member 201 and the optical block 216 are securely bonded and mounted on the circuit board 212 (See FIG. 15). In the meanwhile, for improving the workability, the hard adhesives may be filled into the through hole 205 from the bottom side of the circuit board 212.

Figure 17A:
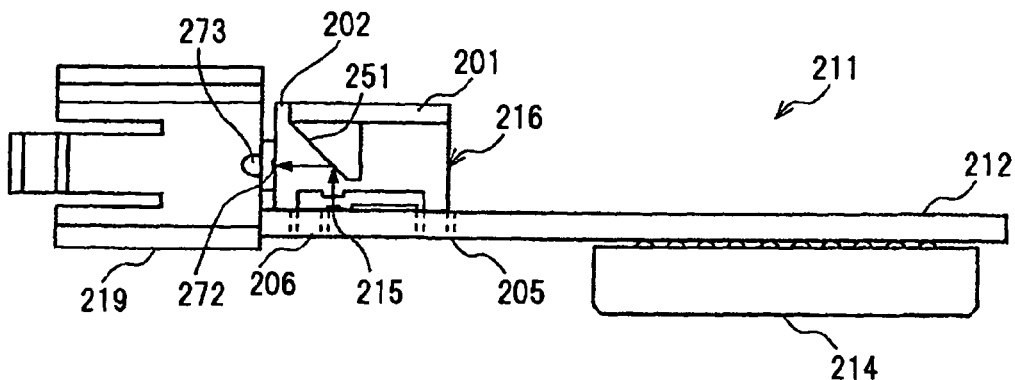
FIG. 17A is a cross sectional view cut along the longitudinal center line of the optical module in FIG. 14.

Then, the adaptor 19 is attached to a casing (e.g., housing based on SNAP1 2 standard) that is formed of a high heat dissipation material such as Zn and Al and has an opening at the bottom (See FIG. 17A). Finally, in the casing, the circuit board 212 with the parts such as the optical block reinforcing member 201 mounted thereon is housed for completing the optical module 211.

The effects and functions of the embodiment will be explained below.

First, the operation of the optical module 211 will be briefly described below.

In using the optical module 211, as shown in FIG. 21, the MT ferrule 282 with the optical fiber 281 connected thereto is further optically coupled with the optical block 216. The receiving surface R of the receiving portion 203 of the optical block 216 contacts the joint surface of the MT ferrule 282.

Figure 17B:
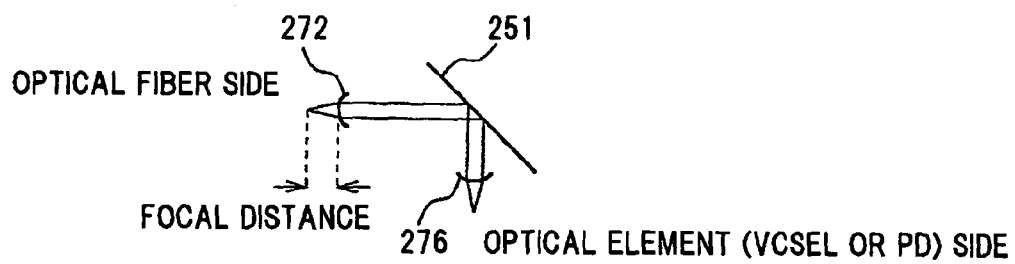
FIG. 17B is a diagram illustrating the propagation behavior of optical signal.

Twelve transmission electrical signals from a network device are, as shown in FIGS. 17A-17B, converted by the LD element module 215 into twelve optical signals. The optical signals are changed upward to forward (to the left in FIG. 17A) in travelling direction by the 45-degree mirror 251 formed in the optical block 216, and are inputted into the optical fiber 281.

The pressing force F applied when connecting the optical connector to the optical block 216 is as strong as 6.8 to 12.8 N at the front face of the optical block 216.

The pressing force F applied when connecting the optical connector can be distributed to the receiving surface R on the front face 271f of the optical block 216 and to the optical block reinforcing member 201 engaged with the stopper portion 202 (especially by a contact face 201a (C-shaped as shown in FIG. 14) contacting the back face of the stopper portion 202). Thus, the pressing force F can be received by the receiving surface R as the butted surface to the optical connector (i.e., MT ferrule 282), and the optical block 216 can be pressed down to the circuit board 212 by the optical block reinforcing member 201 for preventing the separation of the optical block 216 from the circuit board 212. Therefore, the optical block 216 can be prevented from being distorted or deformed so that the focal position of the lenses can be unchanged for providing the good optical coupling.

By combining the optical block reinforcing member 201 with the circuit board 212 as a rigid board and the optical block 216, the optical module 211 can be structured such that no stress occurs at the connection portion between the optical block 216 and the circuit board 212. Furthermore, the optical module 211 can be produced inexpensively with high reliability.

The protruding amount of the receiving portion 203 formed integrally with the optical block 216 is determined according to the focal distance of the first lens array 272.

Since the top of the optical block 216 is covered by the upper lid 201u of the optical block reinforcing member 201, the 45-degree mirror 251 can be dust-proof that is used as the total reflection surface for changing the propagation direction of optical signals.

Since the optical block reinforcing member 201 can be disposed separately from the optical block 216 on the circuit board 212, it can be also applied to the conventional optical module substantially without the design changes of the optical block 216.

As described above, the optical block reinforcing member 201 is composed of the upper lid 201u covering the top of the optical block 216, and the sidewalls 201s covering both sides of the optical block 216. Thus, the optical block reinforcing member 201 can have sufficient strength although lightweight and low-profile, and it can be easy to attach to the optical block 216.

Further, the optical block reinforcing member 201 is provided with the fitting protrusions 206 for engaging with the through holes 205 of the circuit board 212. Thus, the pressing force F during the connection of the optical connector can be also distributed to the fitting protrusions 206 and the circuit board 212. Therefore, the optical module 211 can have higher reliability. Also, the mounting (or positioning) of the optical block reinforcing member 201 and the optical block 216 on the circuit board 212 can be facilitated.

Since the optical block reinforcing member 201 is formed of a metal material, it can be easily integrally shaped by sheet processing or press molding.

Fourth Embodiment

An optical module 291 in a fourth preferred embodiment of the invention will be explained that uses the optical block reinforcing member 201 as well as the optical block 216.

As shown in FIGS. 22 to 25, the optical module 291 of this embodiment is provided with a sub-board 292 made of ceramics such as alumina in addition to the components of the optical module 211 (of the first embodiment) as shown in FIG. 14. In other words, the optical module 291 is formed such that the LD element module 215 and the electronic parts are mounted on the sub-board 292 and the sub-board 292 is disposed between the optical block reinforcing member 201 and the circuit board 212.

The sub-board 292 is formed of a material (e.g., ceramics with a Young's modulus higher than the circuit board 212) harder than the circuit board 212. The sub-board 292 formed of the material harder than the circuit board 212 allows the difficulty in deformation even when stress is applied to the sub-board 292, so that the receiving effect of the pressing force F during the connection of the optical connector to the optical block 216 can be enhanced. The sub-board 292 has a size sufficient to allow all of the optical block 216 with the optical block reinforcing member 201, the optical parts and electrical parts to be mounted thereon. The sub-board 292 is provided with plural (four in FIG. 23) notched grooves 293, each of which has a size bigger than the through hole 205 of the circuit board 212, at both sides thereof.

The optical module 291 can be assembled in the same way as shown in FIGS. 9A to 9D except that the sub-board 292 is previously bonded through conductive adhesives on the circuit board 212.

The optical module 291 is formed such that the pressing force F during the connection of the optical connector can be also distributed to the sub-board 292. Thus, the optical block 216 can be further prevented from being distorted or deformed.

Fifth Embodiment

Figure 26:
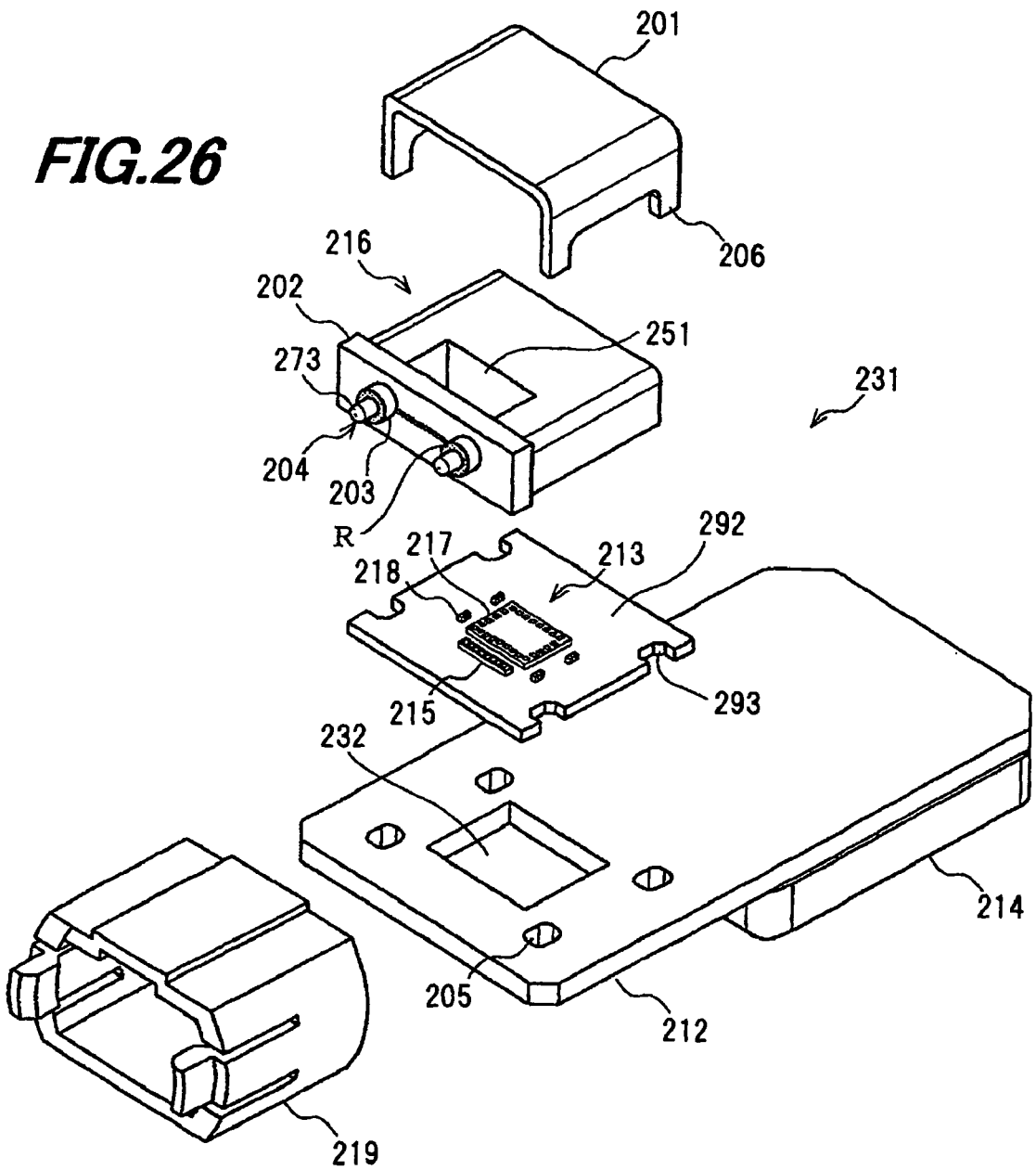
FIG. 26 is an exploded perspective view showing a main part of an optical module using an optical block reinforcing member in a fifth preferred embodiment according to the invention.
Figure 27:
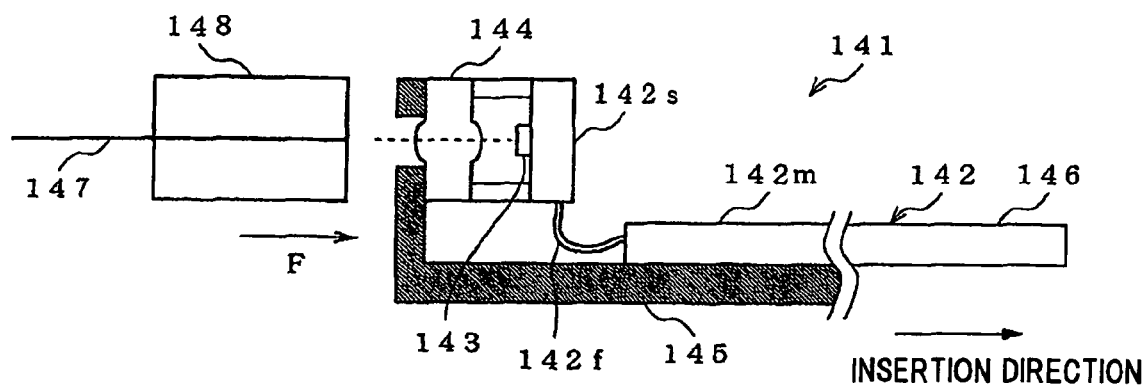
FIG. 27 is a longitudinal cross sectional view showing the conventional optical module.

FIG. 26 is an exploded perspective view showing a main part of an optical module 231 using the optical block reinforcing member 201 in the fifth preferred embodiment according to the invention. The optical module 231 is provided with an opening 232 corresponding to the place to mount the sub-board 292 on the circuit board 212, in addition to the components of the optical module 291 of the fourth embodiment (See FIG. 22), and the sub-board 292 may be mounted covering the opening 232.

The optical module 231 is formed such that heat generated from the electrical parts and optical parts mounted on the sub-board 292 can be radiated through the bottom of the sub-board 292 and the opening 232, for providing higher reliability.

Although in the above embodiments the cylindrical receiving portion 203 is formed on the periphery of the root of the guide pins 273, it may be formed anywhere on the front face 271f of the block body 271.

The distance L5 (See FIG. 18) between the top center of the guide pin 273 and the center of a lens closest to the guide pin 273 is defined by the specifications of SNAP12 (L5=0.925 mm in the embodiments). For the purpose of increasing the area of the receiving surface R as much as possible, the receiving portion 203 may be formed in cross section elliptical with a minor axis equal to the diameter of the receiving portion 203 (circular) or semicircular with a diameter greater than the diameter of the receiving portion 203 (circular).

In the above embodiments, the optical modules 211, 291 and 231 are exemplified that have the circuit board 212 with the electrical connector 214 and are used based on the SNAP12 standard. However, the optical modules may be formed such that they comprise a circuit board with a card-edge connector at other end for applying to XENPAK (optical transceiver operated corresponding to the 10 Gbps Ethernet (registered trademark) interface based on the IEEE802.3), X2 (small optical transceiver following the XENPAK), and XFP (optical transceiver adapted for 10 Gbps and using a serial interface) that are pluggable to a network device.

In the above embodiments, the optical modules are exemplified as the transmission optical transceiver. However, by replacing the LD element module 215 with a PD array and the driver IC 217 with a preamplifier IC for amplifying signals from the PD array, they can be applied to a reception optical transceiver. It is of course applicable to a transmission/reception optical transceiver in like manner.

The assembly method of the optical module 211 is exemplified such that the optical block reinforcing member 201 is previously attached to the optical block 216 for mounting the optical block reinforcing member 201 and the optical block 216 on the circuit board 212 easily with high precision. Alternatively, the optical block reinforcing member 201 may be mounted on the circuit board 212 prior to attaching the optical block 216 to the optical block reinforcing member 201 or the optical block 216 may be mounted on the circuit board 212 prior to attaching the optical block reinforcing member 201 to the optical block 216.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical block for reinforcing an optical block disposed on a circuit board and adapted to be connected to an optical connector, comprising:
   a pressure-receiving surface to which a pressure from the optical connector is applied when connecting the optical connector to the optical block,
   wherein the optical block reinforcing member comprises a separate body from the optical block and is adapted to be attached covering the optical block on the circuit board, wherein:
   the optical block comprises A) a block body, B) a first lens array on a front surface of the block body, the first lens array being adapted to be optically coupled with an optical fiber of the optical connector, C) a reflection surface in the block body for changing a propagation direction of an optical signal, and D) a second lens array on a bottom surface of the block body, the second lens array being adapted to be optically coupled with an optical element mounted on the circuit board; and
   the optical block reinforcing member is substantially C-shaped for covering both sides and a front face of the optical block and comprises an opening on a front face thereof, the opening being adapted to allow passage of an optical signal from the optical connector or the first lens array, wherein the pressure-receiving surface is formed around the opening.

2. The optical block reinforcing member according to claim 1, further comprising:
   a sidewall covering the optical block; and
   a pressure-receiving surface on which the optical block reinforcing member contacts a joint surface of the optical connector,
   wherein the optical block reinforcing member comprises a separate body from the optical block and is adapted to be attached covering the optical block on the circuit board.

3. The optical block reinforcing member according to claim 1, wherein:
   the circuit board comprises a rigid board comprising a through hole formed therein, and
   the optical block reinforcing member comprises a fitting protrusion at a bottom thereof, the fitting protrusion being adapted to be fitted into the through hole.

4. The optical block reinforcing member according to claim 1, wherein:
   the optical block comprises a protrusion at which the optical block contacts the optical block reinforcing member.

5. The optical block reinforcing member according to claim 1, wherein:
   the optical block reinforcing member comprises a thickness for allowing a joint surface of the optical connector to be located nearly at a focal position of the first lens array.

6. The optical block reinforcing member according to claim 1, wherein:
   the optical block reinforcing member comprises a metal material and integrally formed by sheet pressing or press molding.

7. An optical module, comprising:
   an optical element for converting an electrical signal into an optical signal or converting an optical signal into an electrical signal; and
   the optical block reinforcing member as defined by claim 1.

8. The optical module according to claim 7, further comprising:
   a sub-board comprising ceramics,
   wherein the optical element is mounted on the sub-board, and
   the sub-board with the optical element is disposed between the optical block reinforcing member and the circuit board.

9. An optical block reinforcing member for reinforcing an optical block disposed on a circuit board and adapted to be connected to an optical connector, comprising:
   an upper lid for covering the optical block; and
   sidewalls for covering both sides of the optical block arranged perpendicular to a width direction of the optical connector,
   wherein the optical block reinforcing member comprises a separate body from the optical block and is adapted to be attached on the optical block, and
   wherein the optical block comprises a stopper portion comprising an upper stopper portion protruding upward and a side stopper portion protruding laterally, and
   the optical block reinforcing member is stopped by the stopper portion in a direction opposite a connecting direction of the optical connector when the optical block reinforcing member is attached on the optical block.

10. The optical block reinforcing member according to claim 9, wherein:

the optical block reinforcing member comprises a fitting protrusion at a bottom thereof, the fitting protrusion being adapted to be fitted into a through hole formed in the circuit board.

11. An optical module, comprising:

a circuit board;

an optical element mounted on the circuit board;

an electronic part for driving the optical element;

an optical block optically coupled with the optical element and adapted to be connected to an optical connector, wherein the optical block comprises a protrusion comprising a guide pin for connecting the optical block to the optical connector, and a receiving portion formed nearly cylindrical around a root of the guide pin and comprising a receiving surface on which the optical block abuts the optical connector;

an optical block reinforcing member comprising an upper lid for covering the optical block, and sidewalls for covering both sides of the optical block arranged perpendicular to a width direction of the optical connector, wherein the optical block reinforcing member comprises a separate body from the optical block and is adapted to be attached on the optical block; and a casing for housing the circuit board, the optical element, the electronic parts, the optical block and the optical block reinforcing member, wherein the optical block further comprises a stopper portion comprising an upper stopper portion protruding upward and a side stopper portion protruding laterally, and the optical block reinforcing member is stopped by the stopper portion in a direction opposite a connecting direction of the optical connector when the optical block reinforcing member is attached on the optical block.

12. The optical module according to claim 11, wherein:

the optical block further comprises a fiber connecting member formed on a connection surface of the optical block to the optical connector and adapted to be optically coupled with an optical fiber of the optical connector, wherein the receiving portion protrudes by a height nearly equal to a focal distance of the fiber connecting member.

13. The optical module according to claim 11, further comprising:

a sub-board disposed on the circuit board and comprising a material harder than the circuit board, wherein the optical element is mounted on the sub-board.

14. The optical module according to claim 13, wherein:

the circuit board comprises an opening, and the sub-board is disposed covering the opening on the circuit board.

* * * * *